(12) United States Patent
Shimada et al.

(10) Patent No.: US 11,628,820 B2
(45) Date of Patent: Apr. 18, 2023

(54) CONTROL SYSTEM FOR VEHICLE

(71) Applicant: TOYOTA JIDOSHA KABUSHIKI KAISHA, Aichi-Ken (JP)

(72) Inventors: Masanori Shimada, Susono (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 379 days.

(21) Appl. No.: 16/891,074

(22) Filed: Jun. 3, 2020

(65) Prior Publication Data

US 2021/0024052 A1 Jan. 28, 2021

(30) Foreign Application Priority Data

Jul. 25, 2019 (JP) ............................. JP2019-137211

(51) Int. Cl.
*B60W 20/13* (2016.01)
*B60W 10/06* (2006.01)
*B60W 10/08* (2006.01)
*B60W 20/40* (2016.01)

(52) U.S. Cl.
CPC ............ *B60W 20/13* (2016.01); *B60W 10/06* (2013.01); *B60W 10/08* (2013.01); *B60W 20/40* (2013.01); *B60W 2510/244* (2013.01); *B60W 2556/40* (2020.02)

(58) Field of Classification Search
None
See application file for complete search history.

(56) References Cited

U.S. PATENT DOCUMENTS

| | | | |
|---|---|---|---|
| 2008/0262668 A1* | 10/2008 | Yamada | B60K 6/46 701/22 |
| 2010/0006359 A1 | 1/2010 | Ang et al. | |
| 2017/0072937 A1* | 3/2017 | Kapadia | B60W 50/0097 |
| 2019/0023259 A1 | 1/2019 | Huh et al. | |

FOREIGN PATENT DOCUMENTS

| | | |
|---|---|---|
| JP | 200894230 A | 4/2008 |
| JP | 2008265594 A | 11/2008 |
| JP | 2017144801 A | 8/2017 |

* cited by examiner

*Primary Examiner* — Todd Melton
*Assistant Examiner* — Jason R Roberson
(74) *Attorney, Agent, or Firm* — Hauptman Ham, LLP

(57) ABSTRACT

A control system includes a motor-generator, an electric power generation system, and a battery. An EV operation, in which the electric motor is operated while the electric power generation system is stopped, is performed, when an SOC of the battery is higher than a first value, and an HV operation, in which the electric motor is operated while the electric power generation system is operated, is performed, when the SOC is lower than the first value. At the time of the EV operation, in response to a predicted value of the SOC being equal to or higher than a second set value which is lower than the first set value, the EV operation is continued even if the SOC falls below the first value. The predicted value is a predicted value of the SOC assuming continuation of the EV operation from a current location to a destination.

15 Claims, 14 Drawing Sheets

CONTROL SYSTEM FOR VEHICLE

RELATED APPLICATIONS

The present application claims priority of Japanese Patent Application No. 2019-137211, filed Jul. 25, 2019, the disclosure of which is hereby incorporated by reference herein in its entirety.

FIELD

The present disclosure relates to a control system for a vehicle.

BACKGROUND

A control system for a plug-in hybrid vehicle is known, which is provided with an electric motor connected to a vehicle axle to be able to transmit power, an electric power generation system, and a battery supplying electric power to the electric motor and able to be charged from the electric power generation system and a commercial power supply outside of the vehicle, wherein an EV operation, in which the electric motor is operated while the electric power generation system is stopped, is performed, and wherein, if an SOC of the battery falls below a predetermined threshold value during the EV operation, an HV operation, in which the electric motor is operated while the electric power generation system is operated, is performed (see PTL 1, etc.). In PTL 1, if the SOC of the battery becomes low, the HV operation is performed. As a result, the battery is charged from the electric power generation system and the SOC of the battery rises. Note that, as the electric power generation system, a combination of an internal combustion engine and an electric generator or a fuel cell may be considered.

CITATIONS LIST

Patent Literature

[PTL 1] Japanese Unexamined Patent Publication No. 2017-144801

SUMMARY

Technical Problem

In a plug-in hybrid vehicle, during driving, the battery can be charged by the electric power generation system, or from the outside of the vehicle after for example reaching a destination. In this regard, however, if considering the cost of electric power generation per unit amount of electric power, it is more preferable to charge the battery from the outside rather than charge the battery from the electric power generation system. Therefore, for example, if it is projected that even if continuing the EV operation from a current location to the destination, the SOC of the battery will not excessively fall, it is preferable to continue the EV operation and not perform the HV operation even if the SOC of the battery falls below a threshold value. However, in PTL 1, the HV operation is simply started when the SOC of the battery falls below the threshold value. Therefore, the cost required for the vehicle to run by a unit distance may increase.

Solution to Problem

According to the present disclosure, the followings are disclosed:

[Constitution 1]
A control system for a vehicle, comprising:
an electric motor connected to a vehicle axle to be able to transmit power;
an electric power generation system;
a battery configured to supply electric power to the electric motor and to be able to be charged from the electric power generation system and from the outside of the vehicle; and
an electronic control unit configured to perform an EV operation, in which the electric motor is operated while the electric power generation system is stopped, when an SOC of the battery is higher than a predetermined, first set value, and to perform an HV operation, in which the electric motor is operated while the electric power generation system is operated, when the SOC of the battery is lower than the first set value,
wherein the electronic control unit is further configured to continue the EV operation even if the SOC of the battery falls below the first set value when, at the time of the EV operation, it is judged that an EVSOC predicted value is maintained equal to or higher than a second set value which is lower than the first set value, the EVSOC predicted value being a predicted value of the SOC of the battery when assuming continuation of the EV operation from the current location to the destination.

[Constitution 2]
A control system for a vehicle, comprising:
an electric motor and an internal combustion engine connected to a vehicle axle to be able to transmit power;
a battery configured to supply electric power to the electric motor and to be able to be charged from outside the vehicle; and
an electronic control unit configured to perform an EV operation, in which a motor ratio is relatively high, when an SOC of the battery is higher than a predetermined, first set value, and to perform an HV operation, in which the motor ratio is relatively low, when the SOC of the battery is lower than the first set value, the motor ratio being a ration of an output of the electric motor with respect to the total output of the vehicle,
wherein the electronic control unit is further configured to continue the EV operation even if the SOC of the battery falls below the first set value when, at the time of the EV operation, it is judged that an EVSOC predicted value is maintained equal to or higher than a second set value which is lower than the first set value, the EVSOC predicted value being a predicted value of the SOC of the battery when assuming continuation of the EV operation from the current location to the destination.

[Constitution 3]
The control system for a vehicle according to constitution 2, wherein the electronic control unit is further configured to operate the electric motor while stopping the internal combustion engine at the time of the EV operation, and to operate the internal combustion engine and the electric motor at the time of the HV operation.

[Constitution 4]
The control system for a vehicle according to any one of constitutions 1 to 3, wherein the electronic control unit is further configured to continue the EV operation until the destination when it is judged that the EVSOC predicted value is maintained equal to or higher than the second set value.

[Constitution 5]

The control system for a vehicle according to constitution 4, wherein the electronic control unit is further configured to hold unchanged the EV operation until it is judged that a holding time has elapsed from when the vehicle was started for a next trip, when, in a previous trip, the EV operation was continued until the destination with the SOC of the battery being lower than the first set value and then operation of the vehicle was stopped.

[Constitution 6]

The control system for a vehicle according to any one of constitutions 1 to 5, wherein the electronic control unit is further configured, when it is expected that the HV operation will be performed in a next trip, to switch from the EV operation to the HV operation, regardless of the EVSOC predicted value, if the SOC of the battery falls below the first set value at the time of the EV operation.

[Constitution 7]

The control system for a vehicle according to any one of constitutions 1 to 6:

wherein the electronic control unit is further configured, when it is judged that the EVSOC predicted value will fall below the second set value, to switch from the EV operation to the HV operation if the SOC of the battery falls below a third set value which is lower than the first set value and higher than the second set value; and wherein the electronic control unit is further configured to set the third set value so that an HVSOC predicted value is maintained equal to or higher than the second set value, the HVSOC predicted value being a predicted value of the SOC of the battery when assuming continuing the EV operation from the current location, then switching from the EV operation to the HV operation if the SOC of the battery falls below the third set value, and then continuing the HV operation until the destination.

[Constitution 8]

The control system for a vehicle according to constitution 7, wherein the electronic control unit is further configured to set the third set value so that a margin of the HVSOC predicted value with respect to the second set value is made the smallest.

[Constitution 9]

The control system for a vehicle according to any one of constitutions 1 to 8:

wherein the electronic control unit is further configured, when it is judged that the EVSOC predicted value will fall below the second set value, to continue the EV operation until the vehicle passes a third position between a first position and a second position and to switch from the EV operation to the HV operation if the vehicle passes the third position, the first position being a position where the EVSOC predicted value falls below the first set value and the second position being a position where the EVSOC predicted value falls below the second set value; and wherein the electronic control unit is further configured to set the third position so that an HVSOC predicted value is maintained equal to or higher than the second set value, the HVSOC predicted value being a predicted value of the SOC of the battery when assuming continuing the EV operation from the current location, then switching from the EV operation to the HV operation if the vehicle passes the third position, and then continuing the HV operation until the destination.

[Constitution 10]

The control system for a vehicle according to claim 9, wherein the electronic control unit is further configured to set the third position so that a margin of the HVSOC predicted value with respect to the second set value is made the smallest.

Advantageous Effects of Invention

It is possible to reduce a cost required for a vehicle to travel by a unit distance while limiting an SOC of a battery from becoming excessively low.

DESCRIPTION OF EMBODIMENTS

Figure 1:
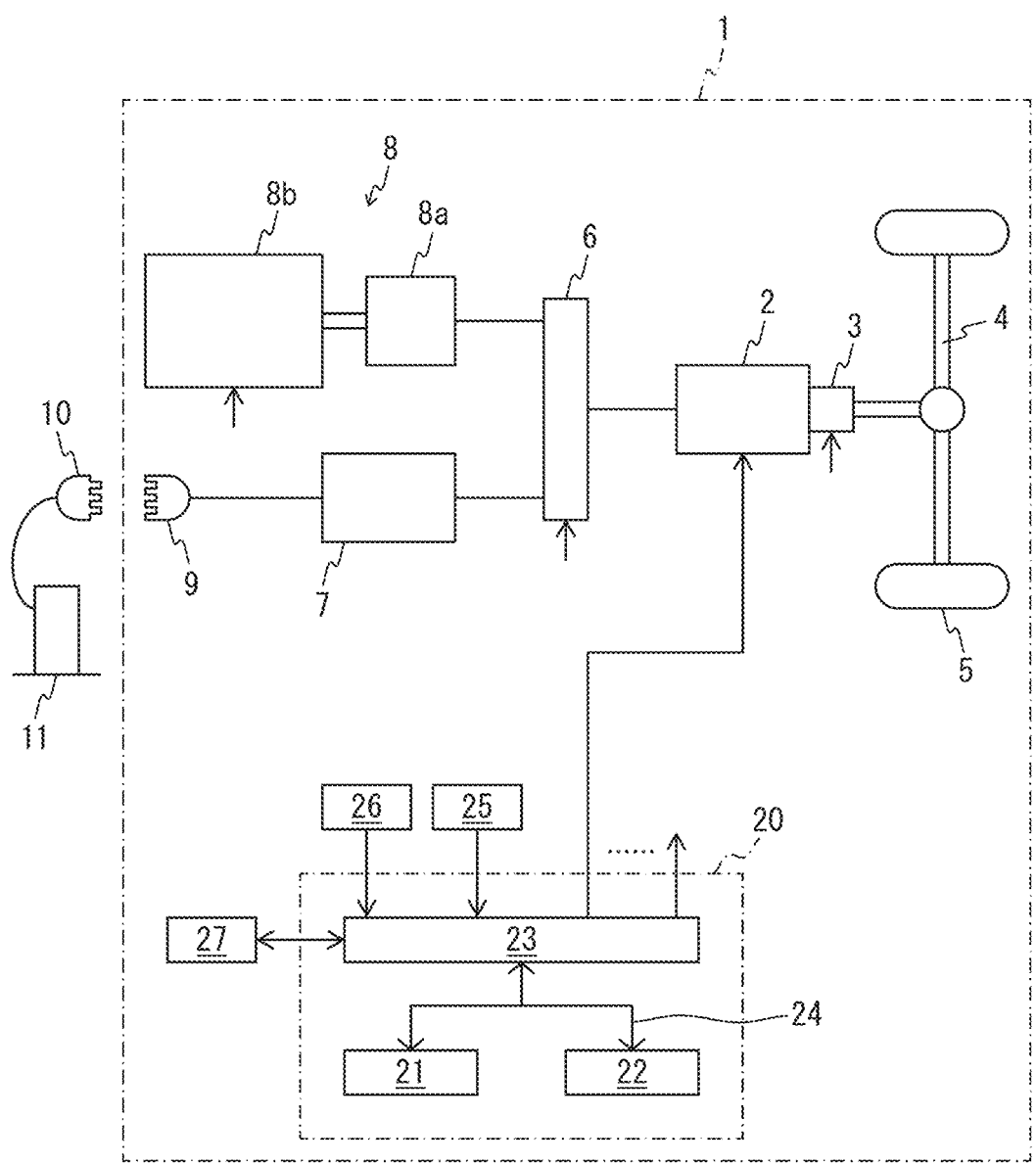
FIG. 1 is a schematic overall view of a plug-in hybrid vehicle of an embodiment according to the present disclosure.

Referring to FIG. 1, a plug-in hybrid vehicle 1 of one embodiment according to the present disclosure comprises a motor-generator 2. An input/output shaft of the motor-generator 2 is connected through, for example, a transmission 3 to be able to transmit power to a vehicle axle 4. Note that 5 shows wheels supported by the vehicle axle 4, in FIG. 1.

In the embodiment according to the present disclosure, the motor-generator 2 is electrically connected through a power control unit 6 to a battery 7. The motor-generator 2 of the embodiment according to the present disclosure operates as an electric motor or electric generator. When the motor-generator 2 operates as an electric motor, that is, at the time of powered operation, electric power is supplied from the battery 7 to the motor-generator 2 and the power generated at the motor-generator 2 is transmitted to the vehicle axle 4. On the other hand, when the motor-generator 2 is operated as an electric generator, that is, at the time of regeneration, power from the vehicle axle 4 is used to generate electric power at the motor-generator 2. This electric power is supplied to and stored at the battery 7. Note that the power control unit 6 of the embodiment according to the present disclosure includes, for example, an inverter for converting current from direct current to alternating current or the reverse, a converter for adjusting the voltage, etc. (not shown).

The vehicle 1 of the embodiment according to the present disclosure is further provided with an electric power generation system 8 electrically connected to the power control unit 6. The electric power generation system 8 of the embodiment according to the present disclosure is provided with an electric generator 8a and an internal combustion engine 8b driving the electric generator 8a. In this case, when the electric power generation system 8 should be operated, the internal combustion engine 8b is operated and therefore the electric generator 8a is operated and electric power is generated. The generated electric power is sent to one or both of the battery 7 and motor-generator 2. When the electric power generation system 8 should be stopped, the internal combustion engine 8b is stopped and therefore the electric generator 8a is stopped. The internal combustion engine 8b is a spark ignition engine or a compression ignition engine. As examples of the fuel of the internal combustion engine 8b, gasoline, diesel fuel, alcohol, CNG, hydrogen, etc. are included. In another embodiment (not shown), the electric power generation system 8 is provided with a fuel cell. The fuel of the electric power generation system 8 in the other embodiment is hydrogen and oxygen.

The battery 7 of the embodiment according to the present disclosure can be charged from the electric power generation system 8 and from the outside of the vehicle. That is, when charging the battery 7, the electric power generation system 8 is operated and electric power generated at the electric power generation system 8 is supplied through the power control unit 6 to the battery 7. Alternatively, the battery 7 is charged by connecting a vehicle-side connector 9 electrically connected to the battery 7 through an outside connector 10 to an outside power supply 11, while stopping the electric power generation system 8. As an example of the outside power supply 11, a commercial power supply is included.

The vehicle 1 of the embodiment according to the present disclosure is provided with an electronic control unit 20. The electronic control unit 20 is provided with one or more processors 21, one or more memories 22, and an input/output port 23, which are communicably connected with each other, via a bidirectional bus 24. One or more sensors 25 are communicably connected to the input/output port 23 of the embodiment according to the present disclosure. The one or more sensors 25 of the embodiment according to the present disclosure include, for example, a sensor configured to detect a speed of the vehicle, an IMU (inertial measurement unit), a GPS receiver configured to receive a GPS signal, a sensor configured to detect a requested vehicle output, etc. The requested vehicle output is expressed by, for example, an amount of depression of an accelerator pedal (not shown). Further, a storage device 26 is communicably connected to the input/output port 23 of the embodiment according to the present disclosure. The storage device 26 of the embodiment according to the present disclosure includes a map data storage device. The map data includes, for example, position of road (for example, latitudes, longitudes, elevations, etc.), shapes of roads, etc. Further, an HMI (human machine interface) 27 is communicably connected to the input/output port 23 of the embodiment according to the present disclosure. The HMI 27 of the embodiment according to the present disclosure includes, for example, a touch panel, display, etc.

Further, the input/output port 23 of the embodiment according to the present disclosure is communicably connected to the motor-generator 2, transmission 3, power control unit 6, and internal combustion engine 8b. The motor-generator 2, transmission 3, power control unit 6, and internal combustion engine 8b are controlled based on signals from the electronic control unit 20.

The electronic control unit 20 of the embodiment according to the present disclosure has various functions obtained by one or more processors 21 executing programs stored in one or more memories 22.

For example, the electronic control unit 20 of the embodiment according to the present disclosure has a host vehicle localization function. The host vehicle localization function of the embodiment according to the present disclosure identifies or deduces a current location of the vehicle 1 based on a GPS signal and map data, etc.

Further, the electronic control unit 20 of the embodiment according to the present disclosure has a navigation function. The navigation function of the embodiment according to the present disclosure calculates a route from the current location to a destination based on the map data, etc. and displays it through the HMI 27 to a driver or a passenger of the vehicle 1. This route is, for example, the best route from the viewpoint of the quantity of energy consumed, required time, etc. Note that, in one example, the destination is input through the HMI 27 by the driver or passenger. In another example, the destination is deduced by the electronic control unit 20 based on the past driving history, etc.

The electronic control unit 20 of the embodiment according to the present disclosure further has an operational control function of controlling a vehicle operation. In the operational control of the embodiment according to the present disclosure, as the vehicle operation, either of an EV operation and an HV operation is performed. In the EV operation of the embodiment according to the present disclosure, the motor-generator 2 is operated while the electric power generation system 8 is stopped. When the EV operation is performed, the SOC (state of charge) or charging rate of the battery 7 falls in the powered operation, and the SOC of the battery 7 rises in the regeneration. On the other hand, in the HV operation of the embodiment according to the present disclosure, the motor-generator 2 is operated while the electric power generation system 8 is operated. If the HV operation is performed, the SOC of the battery 7 rises. Note that, in the HV operation of the embodiment according to the present disclosure, an amount of power generation by the electric power generation system 8 and an operating state of the internal combustion engine 8b are determined in accordance with the vehicle speed.

In the operational control of the embodiment according to the present disclosure, when the SOC of the battery 7 is higher than a predetermined threshold value CSX, the EV operation is performed, while when the SOC of the battery 7 is lower than the threshold value CSX, the HV operation is performed. This limits the frequency of operation of the electric power generation system 8, while limiting the SOC of the battery 7 from becoming excessively low. Note that the threshold value CSX of the embodiment according to the present disclosure is provided with hysteresis.

The electronic control unit 20 of the embodiment according to the present disclosure further has an SOC estimation function. The SOC estimation function of the embodiment according to the present disclosure estimates the SOC of the battery 7 by for example repeatedly cumulatively adding amounts of electric power supplied from the battery 7 and amounts of electric power supplied to the battery 7 per unit time. In general, the SOC will fall when the electric power amount supplied from the battery 7 is larger than that supplied to the battery 7, and will rise when the former is smaller than the latter.

The electronic control unit 20 of the embodiment according to the present disclosure further has a history storing function. The history storing function of the embodiment according to the present disclosure stores the driving history of the vehicle 1, the history of performance of the EV operation and HV operation, the charging history of the battery 7, etc. in the memory 22.

Next, referring to FIG. 2, a first embodiment of the operational control according to the present disclosure will be explained.

Figure 2:
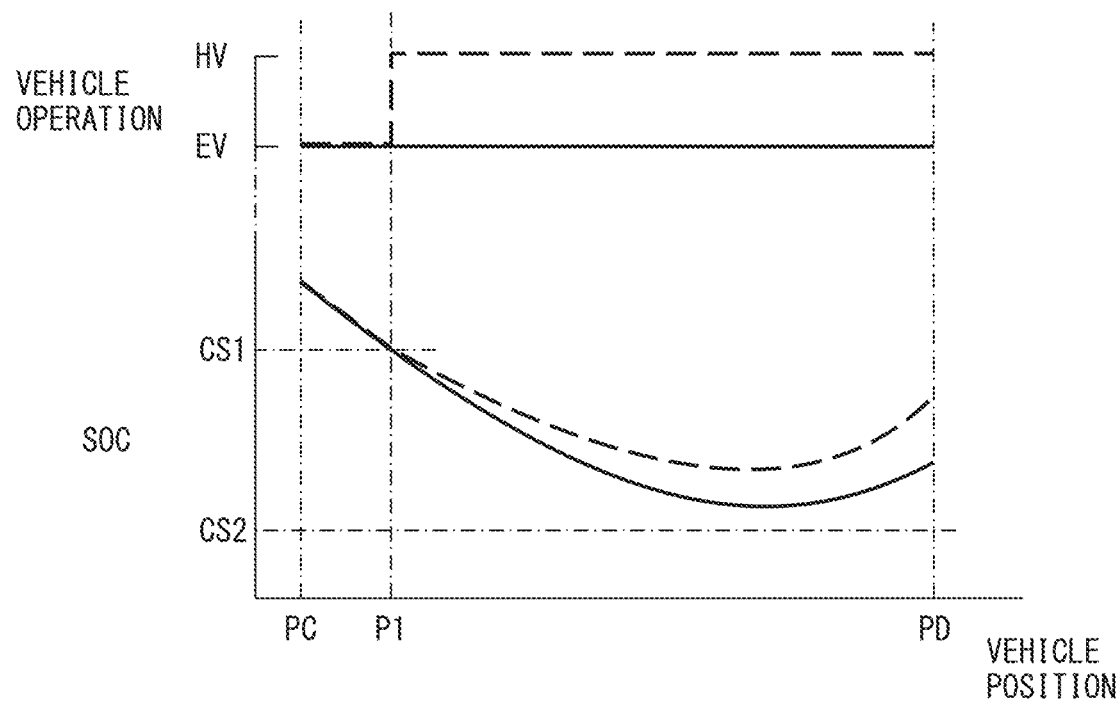
FIG. 2 is a graph showing one example of operational control and an SOC of a battery for explaining a first embodiment of operational control according to the present disclosure.

FIG. 2 shows various examples of the changes in vehicle operation and the SOC of the battery 7 in the case where the vehicle 1 is driven from the current location PC to the destination PD in accordance with a predetermined driving pattern. The driving pattern of the first embodiment of the operational control according to the present disclosure is expressed by the driving route of the vehicle 1, the speed of the vehicle 1 at each position on the driving route, etc. The driving route of the vehicle 1 is calculated by the above-mentioned navigation function. In the example shown in FIG. 2, the EV operation is performed at the current location PC. As the vehicle 1 heads from the current location PC to the destination PD, the SOC of the battery 7 falls. Next, when the vehicle 1 passes a first position P1, the SOC of the battery 7 falls below the threshold value CSX.

The broken line of FIG. 2 shows one example of the case where the above-mentioned threshold value CSX is set to a predetermined, first set value CS1. In this example, when the vehicle 1 passes the first position P1, the vehicle operation is switched from the EV operation to the HV operation. Next, the HV operation is continued until the vehicle 1 reaches the destination PD.

If the SOC of the battery 7 falls below a second set value CS2 lower than the first set value CS1, that is, if the SOC of the battery 7 becomes excessively low, the performance of the battery 7 may remarkably fall. As opposed to this, in the example shown by the broken line in FIG. 2, the SOC of the battery 7 is maintained equal to or higher than the second set value CS2, from the current location PC to the destination PD. Therefore, the performance of the battery 7 is kept from remarkably falling. Note that, the first set value CS1 of the first embodiment of the operational control according to the present disclosure is for example 20 to 30%. Further, the second set value CS2 of the first embodiment of the operational control according to the present disclosure is for example 1 to 5%.

On the other hand, the solid line of FIG. 2 shows one example of the case assuming that the EV operation is continued from the current location PC to the destination PD. In this example as well, the SOC of the battery 7 is maintained equal to or higher than the second set value CS2 from the current location PC to the destination PD. That is, in the example shown in FIG. 2, there is no need to perform the HV operation for maintaining the SOC of the battery 7 equal to or higher than the second set value CS2. The SOC of the battery 7 is restored by charging the battery 7 from the outside, after the vehicle 1 reaches the destination PD.

If considering the cost required for the vehicle 1 to be driven for a unit distance, charge of the battery 7 from the outside is preferable to charge of the battery 7 by the HV operation. Thus, in the first embodiment of the operational control according to the present disclosure, at the time of the EV operation, when it is judged that an EVSOC predicted value PSOCEV, which is a predicted value of the SOC of the battery 7 when assuming the EV operation is continued from the current location PC to the destination PD, will be maintained equal to or higher than the second set value CS2, the EV operation is continued even if the SOC of the battery 7 falls below the first set value CS1. As a result, the cost required for the vehicle 1 to be driven by a unit distance is reduced while the SOC of the battery 7 is kept from becoming excessively low. Further, when the electric power generation system 8 is provided with an internal combustion engine 8b, the operating time of the internal combustion engine 8b is shortened, and thus an amount of emission of the internal combustion engine 8b is reduced.

Specifically, in the first embodiment of the operational control according to the present disclosure, first, the driving pattern of the vehicle 1 from the current location PC to the destination PD is predicted. The driving pattern of the first embodiment of the operational control according to the present disclosure is, as explained above, expressed by the driving route of the vehicle 1 calculated by the navigation function. Therefore, in the first embodiment of the operational control according to the present disclosure, if the destination PD is not input or deduced, or if the driving route is not yet calculated by the navigation function, etc., the EVSOC predicted value PSOCEV cannot be calculated. Note that the driving route includes information on the roads on the driving route (positions (latitudes, longitudes, elevations, etc.), lengths, widths, angles of inclination, speed limits, etc., of road)

Next, a value PQDE, which is the quantity of consumed electric power PQEC predicted when assuming continuation of the EV operation from the current location PC to the destination PD in accordance with this driving pattern, is calculated. In the first embodiment of the operational control according to the present disclosure, the history of the predicted value PQEC of the consumed electric power quantity from the current location PC to the destination PD is calculated as a function of, for example, the position of the vehicle 1. The predicted value PQEC of the consumed electric power quantity of the first embodiment of the operational control according to the present disclosure includes not only the quantity of electric power consumed by the motor-generator 2, but also the quantity of electric power consumed by auxiliaries or the air-conditioning system, etc. Note that, the consumed electric power quantity of the motor-generator 2 is a positive value at the time of powered operation and is a negative value at the time of regeneration.

Next, the EVSOC predicted value PSOCEV, which is the predicted value of the SOC of the battery 7 when assuming continuation of the EV operation from the current location PC to the destination PD in accordance with the driving pattern, is calculated using the predicted value PQEC of the consumed electric power quantity. In the first embodiment of the operational control according to the present disclosure, the history of the EVSOC predicted value PSOCEV from the current location PC to the destination PD is calculated as a function of, for example, the position of the vehicle 1.

Next, it is judged if the EVSOC predicted value PSOCEV will be maintained equal to or higher than the second set value CS2 from the current location PC to the destination PD. When it is judged that the EVSOC predicted value PSOCEV will be maintained equal to or higher than the second set value CS2, the EV operation is continued even if the SOC of the battery 7 falls below the first set value CS1. As opposed to this, when the EVSOC predicted value PSOCEV will not be maintained equal to or higher than the second set value CS2, that is, when it is judged that the EVSOC predicted value PSOCEV will fall below the second set value CS2, the EV operation is switched to the HV operation if the SOC of the battery 7 falls below the first set value CS1.

In order to achieve such operational control, in the first embodiment of the operational control according to the present disclosure, when it is judged that the EVSOC predicted value PSOCEV will be maintained equal to or higher than the second set value CS2, the threshold value CSX is set to a value lower than the first set value CS1 and equal to or higher than the second set value CS2. In one example, the threshold value CSX is set to the second set value CS2. This continues the performance of the EV operation until the destination PD. In another example, the threshold value CSX is set to a value lower than the first set value CS1 and higher than the second set value CS2. This switches the EV operation to the HV operation, after the SOC of the battery 7 falls below the first set value CS1 and before the vehicle 1 reaches the destination PD. On the other hand, in the first embodiment of the operational control according to the present disclosure, when it is judged that the EVSOC predicted value PSOCEV will fall below the second set value CS2, the threshold value CSX is set to the first set value CS1.

In other words, in the first embodiment of the operational control according to the present disclosure, the EV operation is performed based on a result of comparison of the SOC of the battery 7 and the threshold value CSX. In another embodiment (not shown), when it is judged that the EVSOC predicted value PSOCEV will be maintained equal to or higher than the second set value CS2, the EV operation is performed regardless of the result of comparison of the SOC of the battery 7 and the threshold value CSX.

The second set value CS2, in one example, is constant. In another example, the second set value CS2 is changed in accordance with, for example, a degree of deterioration of the battery 7, prediction error, etc.

Figure 3:
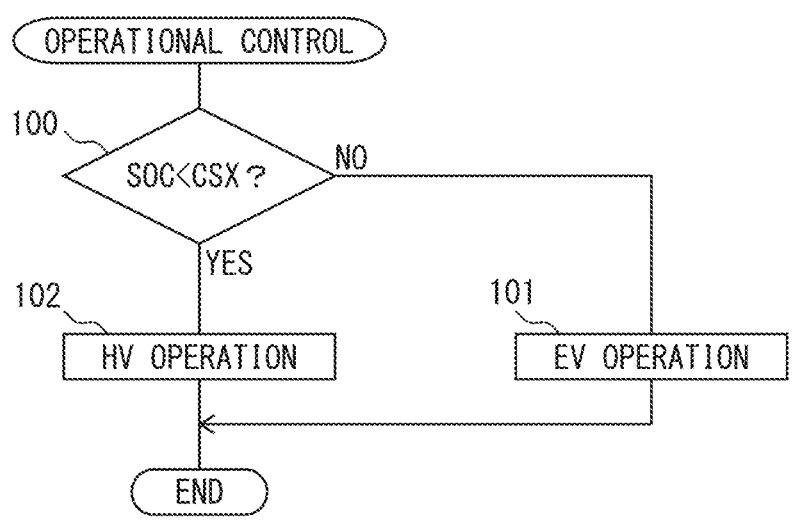
FIG. 3 is a flow chart showing an operational control routine of the first embodiment of the operational control according to the present disclosure.

FIG. 3 shows an operational control routine of the first embodiment of the operational control according to the present disclosure. The routine of FIG. 3 is repeatedly performed. Referring to FIG. 3, at step 100, it is judged if the SOC of the battery 7 is lower than a threshold value CSX. When SOC≥CSX, next, the routine proceeds to step 101 where the EV operation is performed. As opposed to this, when SOC<CSX, the routine proceeds from step 100 to step 102 where the HV operation is performed.

Figure 4:
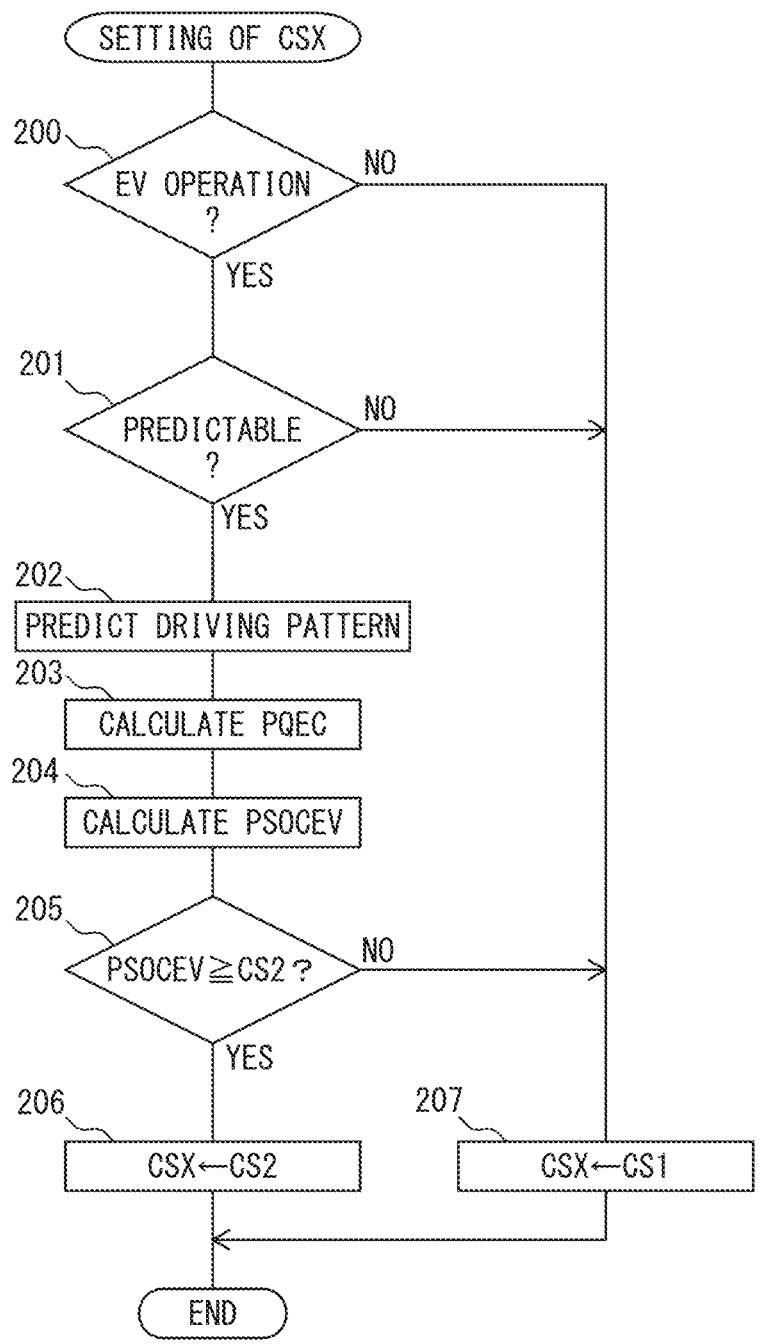
FIG. 4 is a flow chart showing a routine for setting a threshold value CSX of the first embodiment of the operational control according to the present disclosure.

FIG. 4 shows a routine for setting the threshold value CSX of the first embodiment of the operational control according to the present disclosure. The routine of FIG. 4 is repeatedly performed. Referring to FIG. 4, at step 200, whether the EV operation is currently underway is judged. When the EV operation is currently underway, the routine proceeds to step 201 where it is judged if the EVSOC predicted value PSOCEV can be calculated. In the first embodiment of the operational control according to the present disclosure, when the destination PD is not input to the electronic control unit 20, or when the driving route is not yet calculated by the navigation function, etc., it is judged that the EVSOC predicted value PSOCEV cannot be calculated. Further, when the driving route is calculated by the navigation function, it is judged that the EVSOC predicted value PSOCEV can be calculated. When it is judged that the EVSOC predicted value PSOCEV can be calculated, next, the routine proceeds to step 202 where the driving pattern of the vehicle 1 from the current location to the destination is predicted. At the next step 203, the predicted value PQEC of the consumed electric power quantity of the vehicle 1 when assuming the EV operation will be performed from the current location to the destination in accordance with the driving pattern predicted at step 202, is predicted. At the next step 204, the EVSOC predicted value PSOCEV, which is the predicted value of the SOC of the battery 7 when assuming the EV operation will be performed from the current location to the destination in accordance with the driving pattern predicted at step 202, is calculated. At the next step 205, it is judged if the EVSOC predicted value PSOCEV calculated at step 204 will be maintained equal to or higher than the second set value CS2 from the current location to the destination. When it is judged that the EVSOC predicted value PSOCEV will be maintained equal to or higher than the second set value CS2 from the current location to the destination, that is, when PSOCEV≥CS2, next, the routine proceeds to step 206 where the threshold value CSX is set to the second set value CS2. On the other hand, when at step 200 the EV operation is not currently underway, when at step 201 it is judged that the EVSOC predicted value PSOCEV cannot be calculated, or when at step 205, it is judged that the EVSOC predicted value PSOCEV will fall below the second set value CS2, that is, when PSOCEV<CS2, next, the routine proceeds to step 207 where the threshold value CSX is set to the first set value CS1.

Next, a second embodiment of the operational control according to the present disclosure will be explained. The second embodiment of the operational control according to the present disclosure differs from the first embodiment of the operational control according to the present disclosure on the following point. That is, in the second embodiment of the operational control according to the present disclosure, in a case where it is expected that the HV operation will be performed in a trip starting from the destination PD of the current trip, that is, in the next trip, the EV operation is switched to the HV operation if the SOC of the battery 7 falls below the first set value CS1 at the time of the EV operation, regardless of the EVSOC predicted value PSOCEV. As opposed to this, in a case where it is not expected that the HV operation will be performed in the next trip, the operational control is performed in accordance with the EVSOC predicted value PSOCEV, in the same way as the first embodiment of the operational control according to the present disclosure. This further reduces the risk of the SOC of the battery 7 becoming excessively low. Note that, in the second embodiment of the operational control according to the present disclosure, in order to achieve such operational control, when it is expected that the HV operation will be performed in the next trip, the threshold value CSX is set to the first set value CS1, while when it is not expected that the HV operation will be performed in the next trip, in the same way as the first embodiment of the operational control according to the present disclosure, the threshold value CSX is set in accordance with the EVSOC predicted value PSOCEV.

It is expected that the HV operation will be performed in the next trip when there is no power supply able to charge the battery 7 at the destination PD or its environs, when there is no history of charging the battery 7 from the outside at the destination PD or its environs, or when the predicted value of the quantity of electric power consumed in the next trip is great, etc., for example. As opposed to this, it is expected that the HV operation will not be performed in the next trip when there is a power supply able to charge the battery 7 at the destination PD or its environs, when there is a history of charging the battery 7 from the outside at the destination PD or its environs, or when the predicted value of the quantity of electric power consumed in the next trip is small, etc., for example. The predicted value of the quantity of electric power consumed in the next trip, in one example, is calculated based on the past driving history. In another example, the predicted value of the quantity of electric power consumed in the next trip is calculated based on the terrain near the destination PD. That is, for example, if the destination PD is at the bottom of a valley, the vehicle 1 will be driving on an upward slope in the next trip, so it is projected that the quantity of electric power consumed will increase. Conversely, if the destination PD is at a mountain top, the vehicle 1 will be driving on a downward slope in the next trip, so it is projected that the quantity of electric power consumed will decrease.

Figure 5:
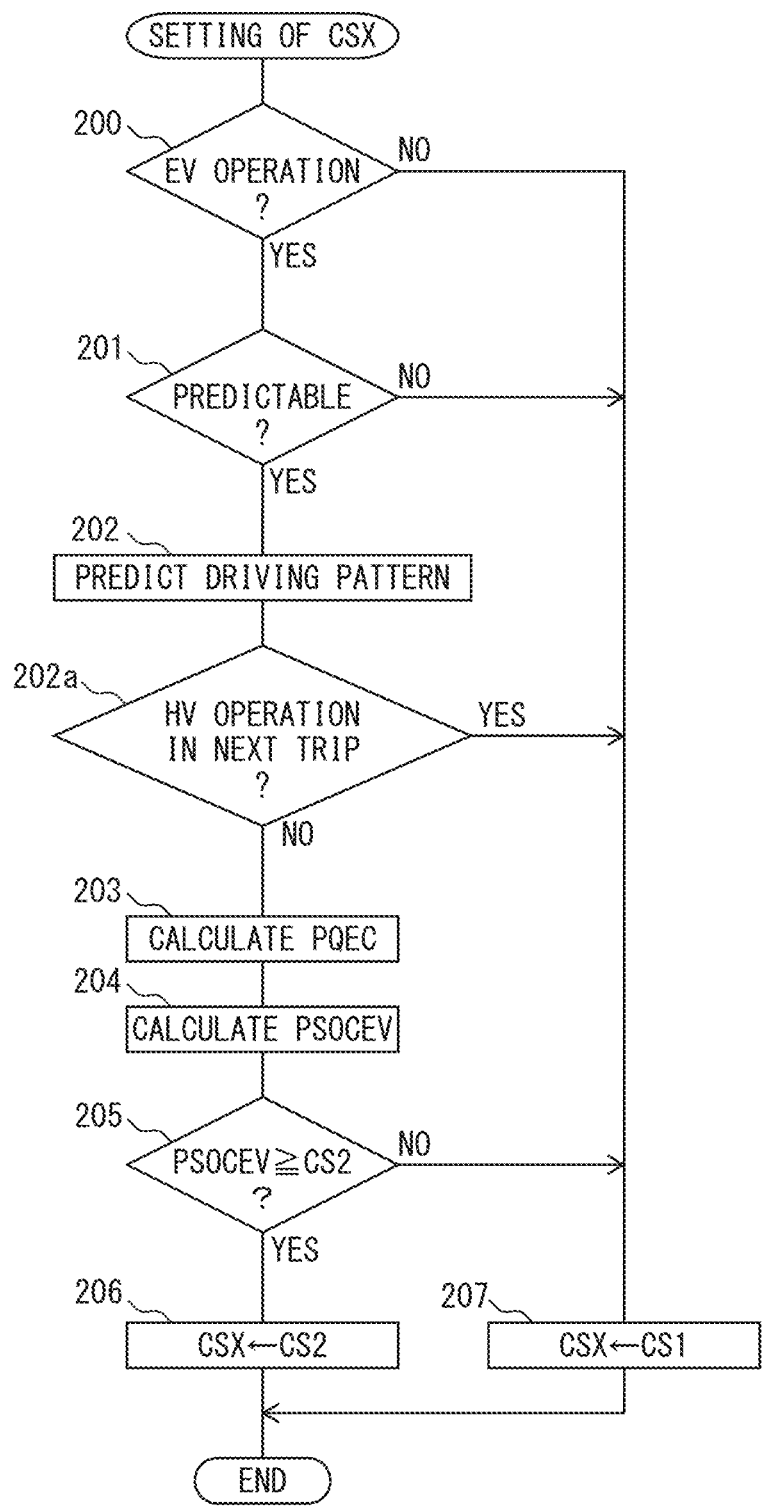
FIG. 5 is a flow chart showing a routine for setting a threshold value CSX of a second embodiment of the operational control according to the present disclosure.

FIG. 5 shows the routine for setting the threshold value CSX of the second embodiment of the operational control according to the present disclosure. The differences between the routine of FIG. 5 and the routine of FIG. 4 will be explained. In the routine of FIG. 5, after step 202, the routine proceeds to step 202*a* where it is judged if it is expected that the HV operation will be performed in the next trip. If it is not expected that the HV operation will be performed in the next trip, the routine proceeds to step 203. As opposed to this, when is expected that the HV operation will be performed in the next trip, the routine proceeds from step 202*a* to step 207 where the threshold value CSX is set to the first set value CS1.

Figure 6:
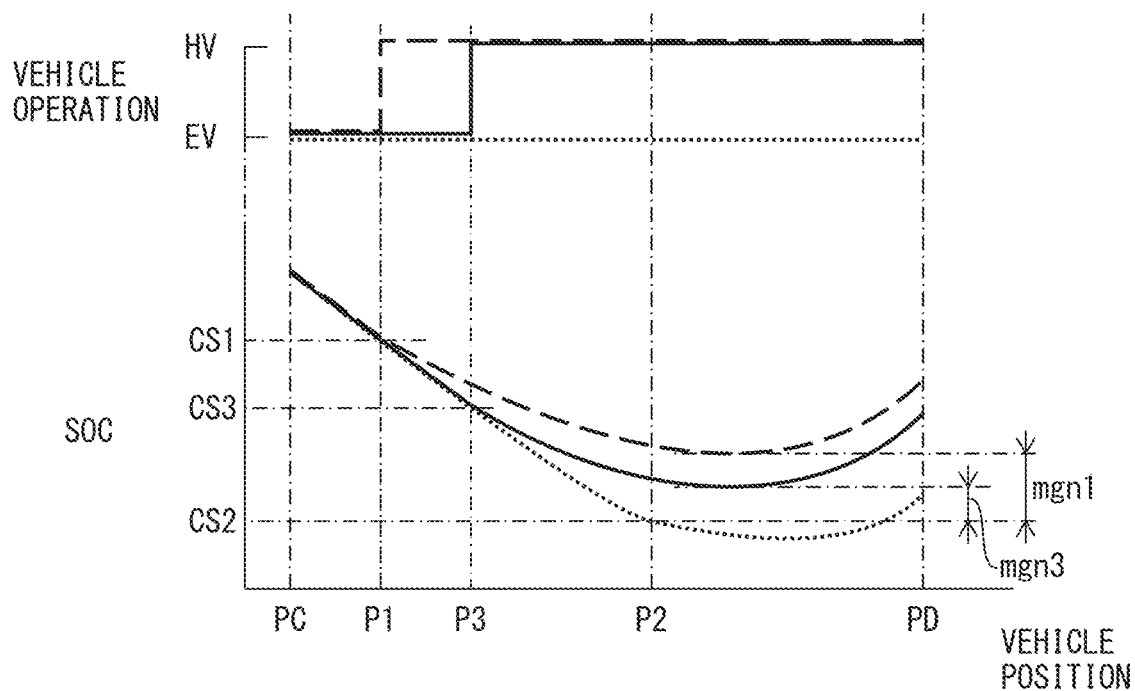
FIG. 6 is a graph showing one example of operational control and an SOC of a battery for explaining a third embodiment of the operational control according to the present disclosure.
Figure 7:
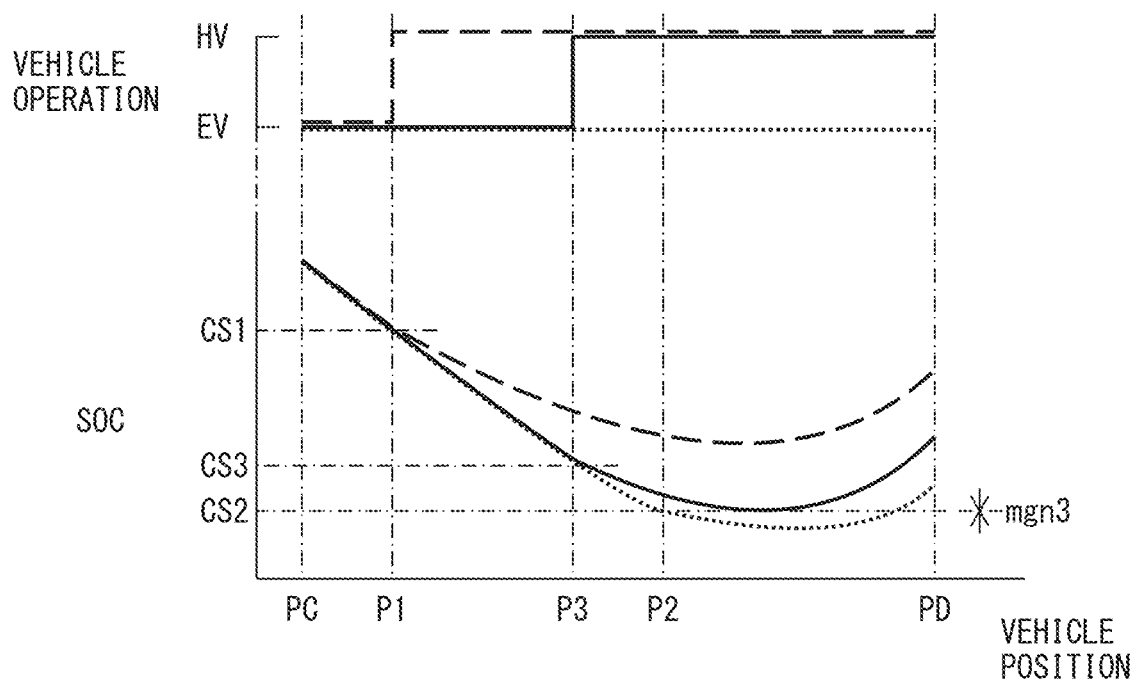
FIG. 7 is a graph showing one example of operational control and an SOC of a battery for explaining the third embodiment of the operational control according to the present disclosure.

Next, the operational control according to a third embodiment of the present disclosure will be explained. Below, the difference between the third embodiment of the operational control according to the present disclosure and the first embodiment of the operational control according to the present disclosure will be explained, referring to FIG. 6 and FIG. 7. FIG. 6 and FIG. 7 show various examples of the changes in vehicle operation and the SOC of the battery 7 in the case where the vehicle 1 is driven from the current location PC to the destination PD in accordance with a predetermined driving pattern.

The dotted line in FIG. 6 shows an example of the case of assuming the EV operation will be continued from the current location PC to the destination PD. In this example, when the vehicle position passes P2, the SOC of the battery 7 falls below the second set value CS2. Therefore, in the driving pattern of the vehicle 1 in the example of FIG. 6, the EV operation cannot be continued until the destination PD.

In the above-mentioned first embodiment of the operational control according to the present disclosure, when it is judged that the EVSOC predicted value PSOCEV will fall below the second set value CS2, as shown by the broken line in FIG. 6, if the vehicle 1 passes the first position P1 and the SOC of the battery 7 falls below the first set value CS1, the EV operation is switched to the HV operation. In other words, the threshold value CSX is set to the first set value CS1. As a result, the SOC of the battery 7 is maintained equal to or higher than the second set value CS2 until the destination PD.

Here, if referring to the difference ($\geq 0$) between the smallest value of the SOC of the battery from the current location PC to the destination PD and the second set value CS2 as a margin, the margin is preferably as small as possible, from the viewpoint of the cost of generation of electric power. However, the margin mgn1 of the example shown by the broken lines of FIG. 6 is relatively large.

Thus, in the third embodiment of the operational control according to the present disclosure, when it is judged that the EVSOC predicted value PSOCEV will fall below the second set value CS2, the EV operation is continued even if the SOC of the battery 7 falls below the first set value CS1. Next, if the SOC of the battery 7 falls below a third set value CS3 which is lower than the first set value CS1 and higher than the second set value, the EV operation is switched to the HV operation. In this case, the third set value CS3 is set so that the SOC of the battery 7 is maintained equal to or higher than the second set value CS2 from the current location PC to the destination PD. As a result, as shown by the solid line in FIG. 6, the margin mgn3 is made smaller than the margin mgn1 of the example shown by the broken lines in FIG. 6 while the SOC of the battery 7 is maintained equal to or higher than the second set value CS2 up to the destination PD. Therefore, the cost of electric power generation is reduced more.

In the third embodiment of the operational control according to the present disclosure, further, as shown by the solid line in FIG. 7, the third set value CS3 is set so that the margin mgn3 in the example of FIG. 6 becomes the smallest, for example, zero. As a result, the cost of electric power generation is further reduced.

In order to achieve such operational control, in the third embodiment of the operational control according to the present disclosure, when it is judged that the EVSOC predicted value PSOCEV will fall below the second set value CS2, the third set value CS3 is calculated and the threshold value CSX is set to the third set value CS3.

The third set value CS3 is found as follows, for example. That is, in the third embodiment of the operational control according to the present disclosure, a specific vehicle operation is envisioned in which the EV operation is continued from the current location PC, and then the EV operation is switched to the HV operation when the SOC of the battery 7 falls below a temporary third set value CS3*t*, and then the HV operation is continued until the destination PD. Next, a predicted value of the SOC of the battery 7 when assuming this specific vehicle operation is performed is calculated as an HVSOC predicted value PSOCHV.

Next, the predicted value PQEC of the consumed electric power quantity and predicted value PQEG of the generated electric power quantity when assuming the specific vehicle operation is performed in accordance with a predicted driving pattern of the vehicle are calculated. In the third embodiment of the operational control according to the present disclosure, the history of the predicted value PQEC of the consumed electric power quantity and predicted value PQEG of the generated electric power quantity from the current location PC to the destination PD is calculated as a function of, for example, the position of the vehicle 1. The predicted value PQEC of the consumed electric power quantity of the third embodiment of the operational control according to the present disclosure includes not only the quantity of electric power consumed of the motor-generator 2, but also the quantity of electric power consumed of the auxiliaries, air-conditioning system, etc. Note that, the quantity of electric power consumed of the motor-generator 2 becomes a positive value at the time of powered operation and a negative value at the time of regeneration. On the other hand, the predicted value PQEG of the generated electric power quantity of the third embodiment of the operational control according to the present disclosure is the predicted value of the amount of electric power generated by the electric power generation system 8.

Next, the HVSOC predicted value PSOCHV of the predicted value of the SOC of the battery 7 when assuming the specific vehicle operation is performed in accordance with a driving pattern is calculated using the predicted value PQEC of the consumed electric power quantity and the predicted value PQEG of the generated electric power quantity. In the third embodiment of the operational control according to the present disclosure, the history of the HVSOC predicted value PSOCHV from the current location PC to the destination PD is calculated as a function of the position of the vehicle 1, for example.

Next, it is judged if a specific condition, in which the thus calculated HVSOC predicted value PSOCHV is maintained equal to or higher than the second set value CS2 from the current location PC to the destination PD and the margin of the HVSOC predicted value PSOCHV is the smallest, stands. When it is not judged that the specific condition stands, the temporary third set value CS3t is updated or changed and the HVSOC predicted value PSOCHV is newly calculated. Next, it is judged if the specific condition stands for the new HVSOC predicted value PSOCHV. This procedure is repeated until it is judged that the specific condition stands. When it is judged that the specific condition stands, the temporary third set value CS3t used for calculating the HVSOC predicted value PSOCHV at this time is made the third set value CS3. In other words, in the third embodiment of the operational control according to the present disclosure, the third set value CS3 is set so that the HVSOC predicted value PSOCHV is maintained equal to or higher than the second set value CS2 from the current location PC to the destination PD and so that the margin of the HVSOC predicted value PSOCHV is the smallest.

In the third embodiment of the operational control according to the present disclosure, the temporary third set value CS3t is updated from an initial value CS3t0. As the initial value CS3t0, the first set value CS1, the second set value CS2, or a value between the first set value CS1 and the second set value CS2 is used. Further, in the third embodiment of the operational control according to the present disclosure, the temporary third set value CS3t is updated by adding or subtracting a small constant value, for example. In one example, the temporary third set value CS3t is made to gradually increase from the second set value CS2 until the above-mentioned specific condition stands.

In another embodiment (not shown), the third set value CS3 is found by the bisection method using the first set value CS1 and the second set value CS2 as the opposite ends. In still another embodiment (not shown), the third set value CS3 is found by the gradient method using a value between the first set value CS1 and the second set value CS2 as an initial value. In still another embodiment (not shown), a plurality of temporary third set values CS3t are set and parallel calculations are performed, and then the optimum result is selected to thereby find the third set value CS3.

Figure 8:
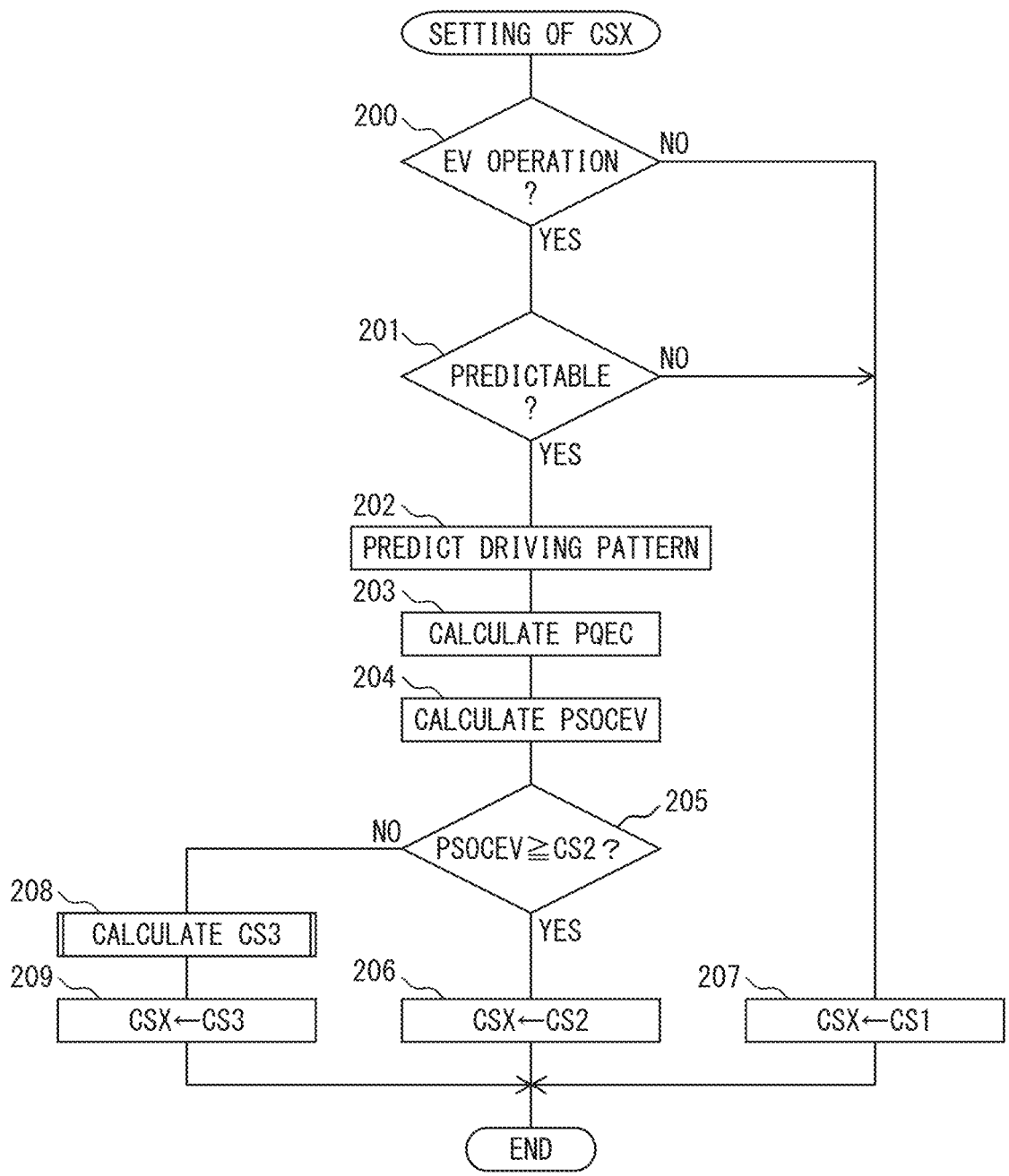
FIG. 8 is a flow chart showing a routine for setting a threshold value CSX of the third embodiment of the operational control according to the present disclosure.
Figure 9:
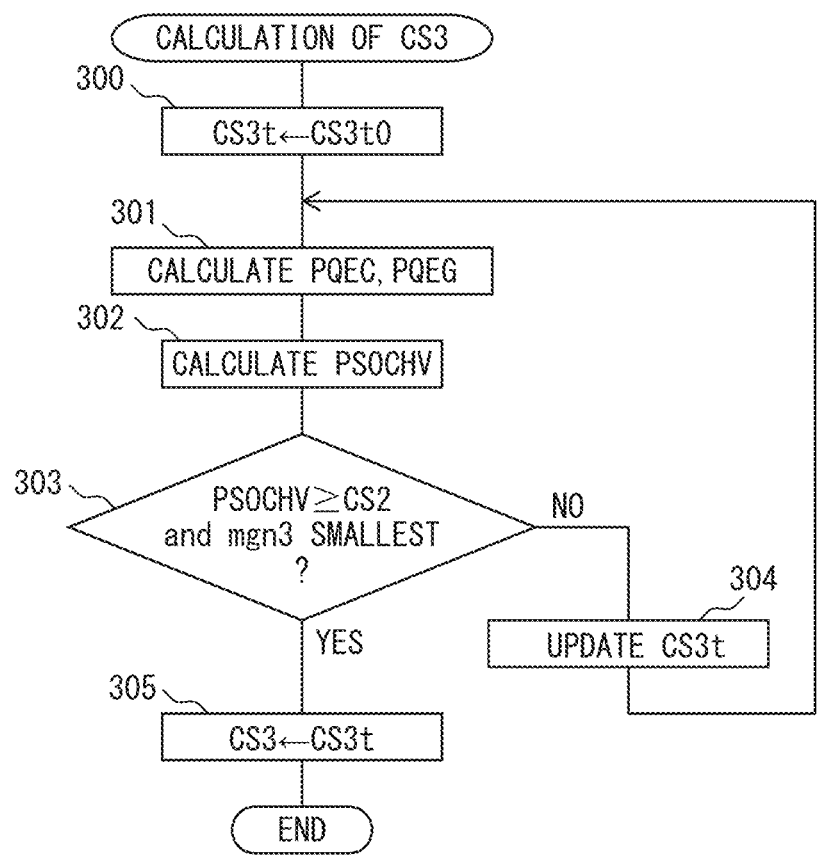
FIG. 9 is a flow chart showing a routine for calculating a third set value CS3 of the third embodiment of the operational control according to the present disclosure.

FIG. 8 shows a routine for setting the threshold value CSX of the third embodiment of the operational control according to the present disclosure. Explaining the difference between the routine of FIG. 8 and the routine of FIG. 4, in the routine of FIG. 8, at step 205, when PSOCEV≥CS2, next, the routine proceeds to step 208 where a routine for calculation of the third set value CS3 is performed and the third set value CS3 is calculated. The routine for calculation of the third set value CS3 of the third embodiment of the operational control according to the present disclosure is shown in FIG. 9. At the next step 209, the threshold value CSX is set to the third set value CS3.

FIG. 9 shows a routine for calculation of the third set value CS3 of the third embodiment of the operational control according to the present disclosure. Referring to FIG. 9, at step 300, the temporary third set value CS3t is set to the initial value CS3t0. At the next step 301, the predicted value PQEC of the consumed electric power quantity and the predicted value PQEG of the generated electric power quantity are calculated. At the next step 302, the HVSOC predicted value PSOCHV is calculated. At the next step 303, it is judged if the HVSOC predicted value PSOCHV will be maintained equal to or higher than the second set value CS2 from the current location PC to the destination PD and the margin mgn3 is the smallest. When it is not judged that the HVSOC predicted value PSOCHV will be maintained equal to or higher than the second set value CS2 from the current location PC to the destination PD and the margin mgn3 is the smallest, next, the routine proceeds to step 304 where the temporary third set value CS3t is updated. Next, the routine returns to step 301. As opposed to this, when it is judged that the HVSOC predicted value PSOCHV will be maintained equal to or higher than the second set value CS2 from the current location PC to the destination PD and the margin mgn3 is the smallest, next, the routine proceeds to step 305 where the third set value CS3 is set to the temporary third set value CS3t.

Next, a fourth embodiment of the operational control according to the present disclosure will be explained. Below, the difference between the fourth embodiment of the operational control according to the present disclosure and the third embodiment of the operational control according to the present disclosure will be explained, referring again to FIG. 6 and FIG. 7. In the third embodiment of the operational control according to the present disclosure, operational control is performed based on the HVSOC predicted value PSOCHV or the SOC of the battery 7. As opposed to this, in the fourth embodiment of the operational control according to the present disclosure, operational control is performed based on the vehicle position.

Specifically, when it is judged that the EVSOC predicted value PSOCEV will fall below the second set value CS2, the EV operation is continued until the vehicle 1 passes the third position P3 between the first position P1 and the second position P2 and the EV operation is switched to the HV operation if the vehicle 1 passes the third position P3, as shown by the solid lines in FIG. 6 and FIG. 7. In this case, in the fourth embodiment of the operational control according to the present disclosure, the third position P3 is set so that the HVSOC predicted value PSOCHV is maintained equal to or higher than the second set value CS2, wherein the HVSOC predicted value PSOCHV is a predicted value of the SOC of the battery 7 when assuming EV operation is continued from the current location, then the EV operation is switched to the HV operation if the vehicle 1 passes the third position P3, and then the HV operation continues until the destination. Note that, in the fourth embodiment of the operational control according to the present disclosure, the first position P1 is the position where the EVSOC predicted value PSOCEV will fall under the first set value CS1. When there are several positions where the EVSOC predicted value PSOCEV will fall under the first set value CS1, a position among them the closest to the current location PC is made the first position P1. On the other hand, in the fourth embodiment of the operational control according to the present disclosure, the second position P2 is a position where the EVSOC predicted value PSOCEV will fall under the second set value CS2. When there are several positions where the EVSOC predicted value PSOCEV will fall under the second set value CS2, a position among these closest to the current location PC is made the second position P2.

Furthermore, in the fourth embodiment of the operational control according to the present disclosure, as shown by the solid line in FIG. 7, the third position P3 shown in the example of FIG. 6 is set so that the margin mgn3 becomes the smallest, for example, zero. As a result, the cost of electric power generation is further decreased.

In the fourth embodiment of the operational control according to the present disclosure, in order to achieve the above operational control, when it is judged that the EVSOC predicted value PSOCEV will fall under the second set value CS2, the third position P3 is calculated and the threshold position PX is set to the third position P3. Next, the EV operation is performed until the vehicle 1 passes the threshold position PX and the HV operation is performed when vehicle 1 passes the threshold position PX. Note that the third position P3 of the fourth embodiment of the operational control according to the present disclosure is calculated in the same way as the third set value CS3 of the third embodiment of the operational control according to the present disclosure.

In this way, in the fourth embodiment of the operational control according to the present disclosure, when it is judged that the EVSOC predicted value PSOCEV will fall below the second set value CS2, the EV operation is switched to the HV operation based on the position of the vehicle 1. This is due to the following reasons.

Figure 10:
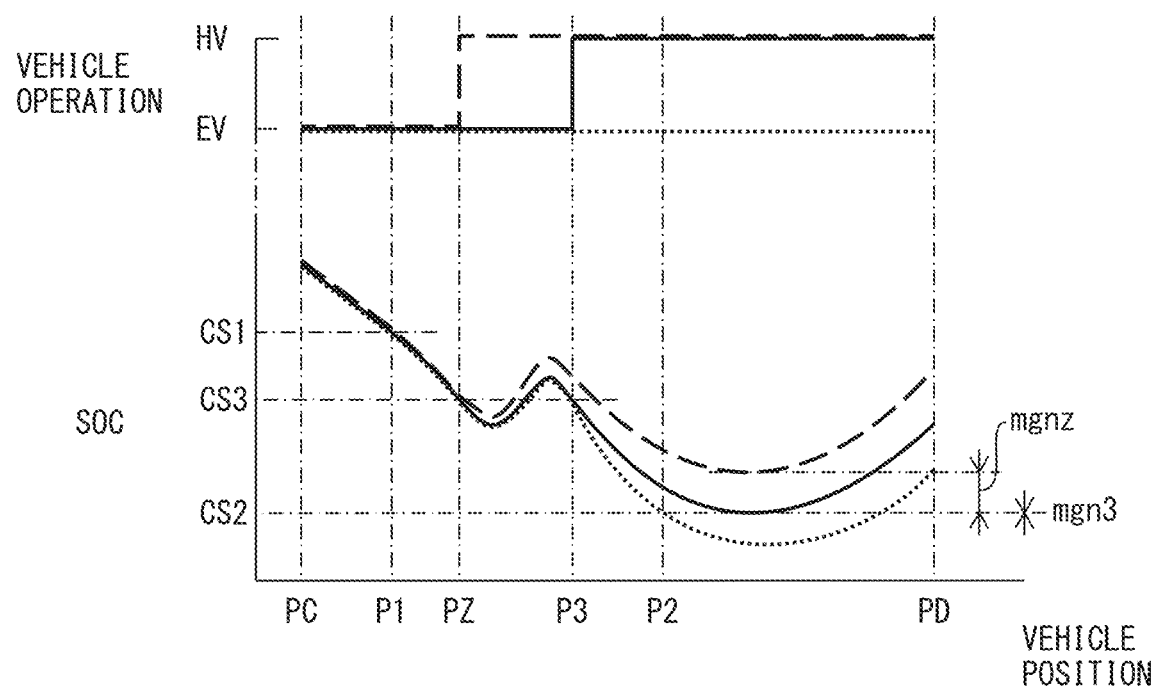
FIG. 10 is a graph showing one example of operational control and an SOC of a battery for explaining a fourth embodiment of the operational control according to the present disclosure.

FIG. 10 shows various examples of the changes in vehicle operation and the SOC of the battery 7 in the case of the vehicle 1 being driven from the current location PC to the destination PD according to a predetermined driving pattern. The dotted line of FIG. 10 shows one example of the case assuming continuation of the EV operation from the current location PC to the destination PD. Therefore, the SOC of the battery 7 shown by the dotted line in FIG. 10 corresponds to the EVSOC predicted value PSOCEV. Further, in FIG. 10, CS3 shows the third set value found by the third embodiment of the operational control according to the present disclosure. Therefore, in the example shown in FIG. 10, if the vehicle 1 passes the position PZ and the position P3, the EVSOC predicted value PSOCEV will fall below the third set value CS3.

In the third embodiment, if the SOC of the battery 7 falls below the third set value CS3, the EV operation is switched to the HV operation. For this reason, in the example of FIG. 10, if the vehicle 1 passes a position PZ closer than the current location PC, the EV operation is switched to the HV operation, as shown by the dotted line in FIG. 10. As a result, it may not be possible to make the margin mgnz the smallest.

As opposed to this, in the fourth embodiment of the operational control according to the present disclosure, the third position P3 is set so that the HVSOC predicted value PSOCHV is maintained equal to or higher than the second set value CS2 and the margin mgn3 of the HVSOC predicted value PSOCHV is made the smallest, and the EV operation is switched to the HV operation if the vehicle 1 passes the third position P3. As a result, as shown by the solid line in FIG. 10, the margin mgn3 is made the smallest while the SOC of the battery 7 is maintained equal to or higher than the second set value CS2.

Figure 11:
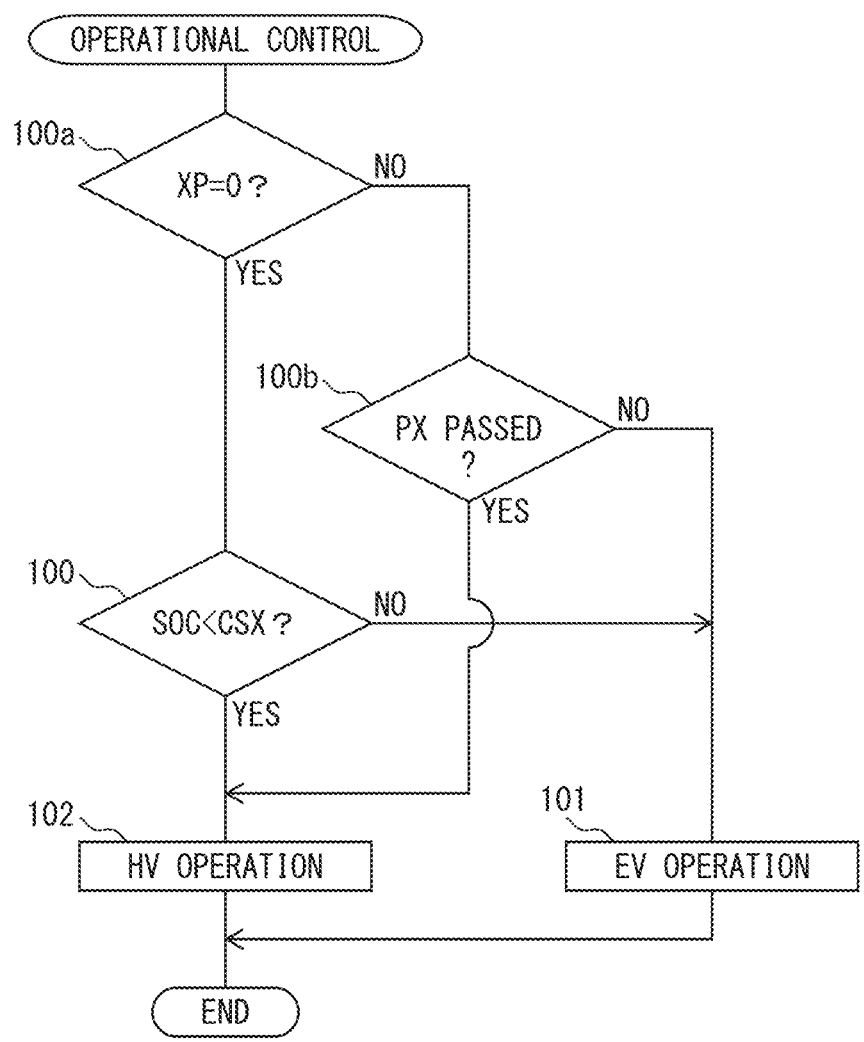
FIG. 11 is a flow chart showing an operational control routine of the fourth embodiment of the operational control according to the present disclosure.

FIG. 11 shows an operational control routine of the fourth embodiment of the operational control according to the present disclosure. Explaining the difference of the routine of FIG. 11 and the routine of FIG. 3, in the routine of FIG. 11, first, at step 100*a*, it is judged if a flag XP has been set. The flag XP is set (XP=1) when it is judged in the routine shown in FIG. 12 that the EVSOC predicted value PSOCEV will fall below the second set value CS2 and is otherwise reset (XP=0). When the flag XP has been reset, next, the routine proceeds to step 100. As opposed to this, when the flag XP is set, next, the routine proceeds to step 100*b* where it is judged if the vehicle 1 has passed the threshold position PX. When it is judged that the vehicle 1 has not passed the threshold position PX, next, the routine proceeds to step 102 where the EV operation is continued. As opposed to this, when it is judged that the vehicle 1 has passed the threshold position PX, next, the routine proceeds to step 102 where the HV operation is performed.

Figure 12:
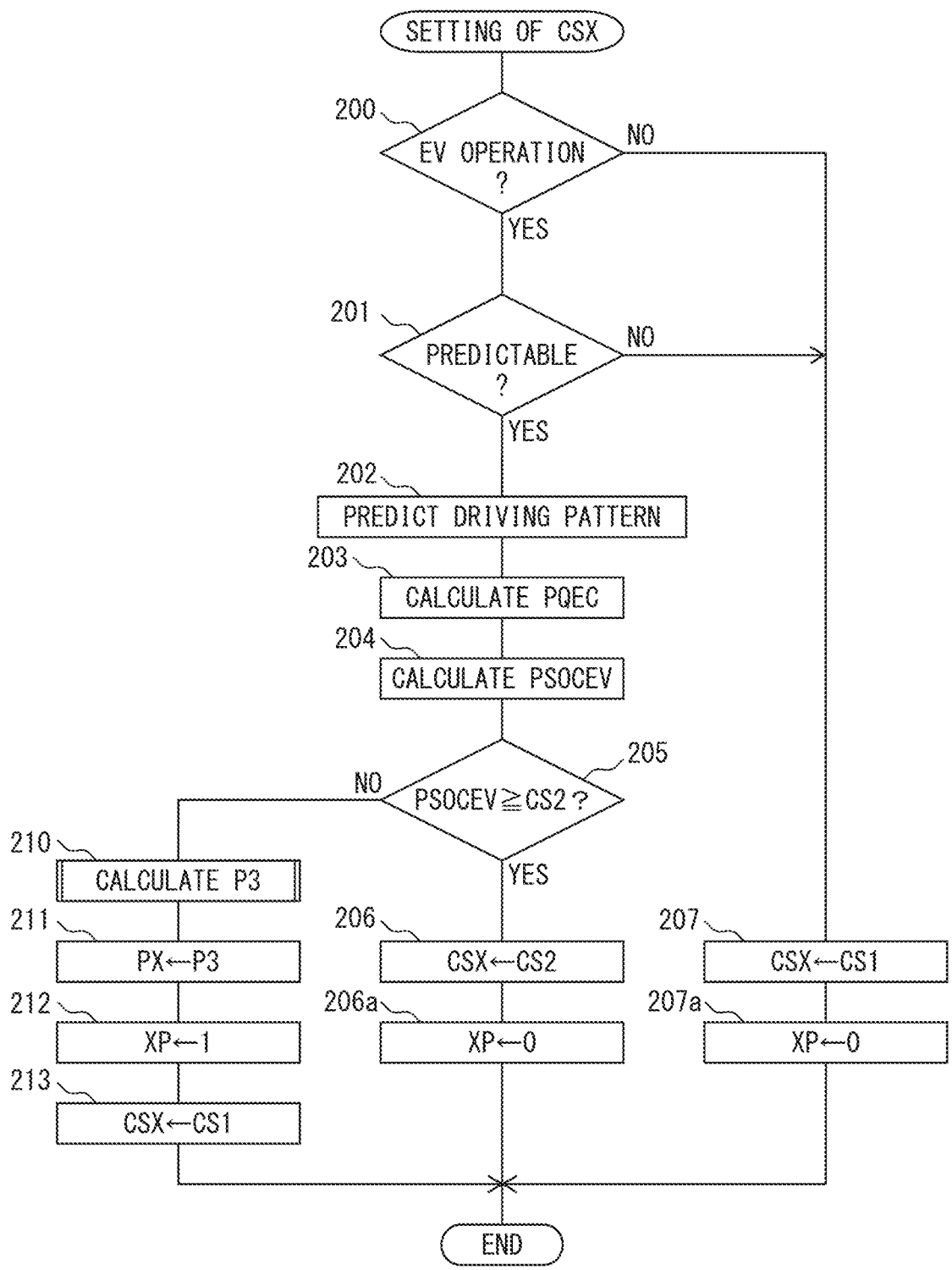
FIG. 12 is a flow chart showing a routine for setting a threshold value CSX of the fourth embodiment of the operational control according to the present disclosure.
Figure 13:
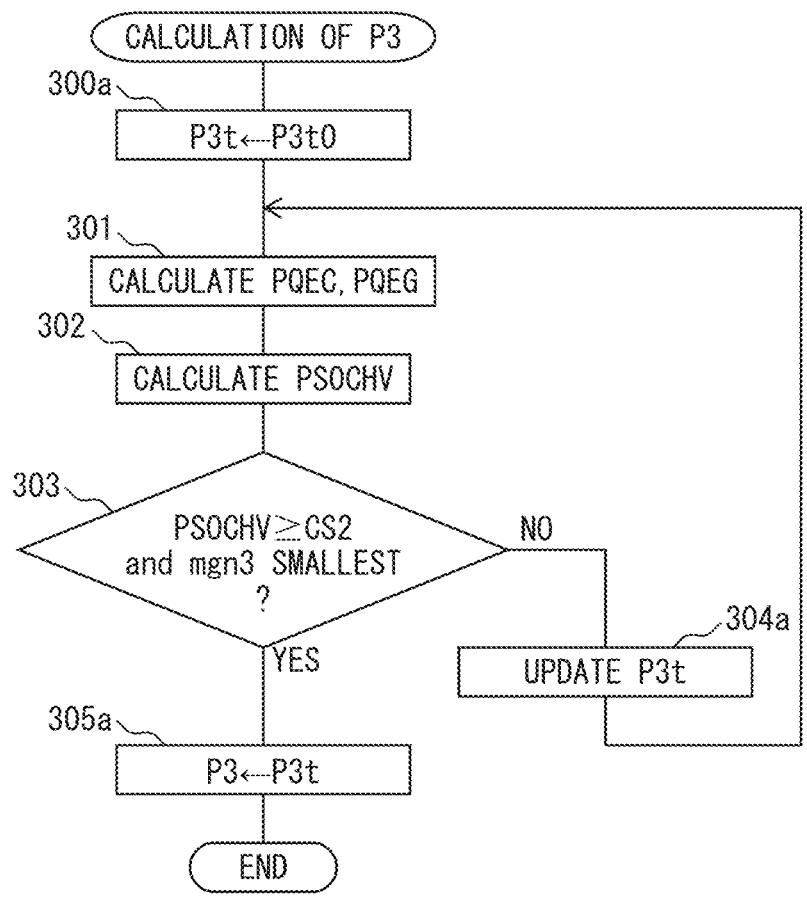
FIG. 13 is a flow chart showing a routine for calculating a third position P3 of the fourth embodiment of the operational control according to the present disclosure.

FIG. 12 shows a routine for setting the threshold value CSX, of the fourth embodiment of the operational control according to the present disclosure. Explaining the difference between the routine of FIG. 12 and the routine of FIG. 8, in the routine of FIG. 12, when PSOCEV≥CS2 at step 205, next, the routine proceeds to step 210 where a routine for calculation of the third position P3 is performed and the third position P3 is calculated. The routine for calculation of the third position P3 of the fourth embodiment of the operational control according to the present disclosure is shown in FIG. 13. At the next step 211, the threshold position PX is set to the third position P. At the next step 212, the flag XP is set. At the next step 213, the threshold value CSX is set to the first set value CS1. Further, in the routine of FIG. 12, at step 206*a* after step 206 and step 207*a* after step 207, the flag XP is reset.

FIG. 13 shows a routine for calculation of the third position P3 of the fourth embodiment of the operational control according to the present disclosure. Explaining the difference between the routine of FIG. 13 and the routine of FIG. 9, in the routine of FIG. 13, at step 300*a*, the temporary third position P3*t* is set to the initial position P3*t*0. Next, the routine proceeds to step 301. Further, when it is not judged that the HVSOC predicted value PSOCHV is maintained equal to or higher than the second set value CS2 and the margin mgn3 is the smallest, next, the routine proceeds to step 304 where the temporary third position P3*t* is updated. Next, the routine returns to step 301. As opposed to this, when it is judged that the HVSOC predicted value PSOCHV is maintained equal to or higher than the second set value CS2 from the current location PC to the destination PD and the margin mgn3 is the smallest, next, the routine proceeds to step 305*a* where the third position P3 is set to the temporary third position P3*t*.

Next, a fifth embodiment of the operational control according to the present disclosure will be explained. Below, the difference between the fifth embodiment of the operational control according to the present disclosure and the first embodiment of the operational control according to the present disclosure will be explained.

In a case where, in the previous trip, the EV operation was continued until the destination PD with the SOC of the battery 7 being lower than the first set value CS1 and the vehicle 1 was then stopped, that is, the power supply of the vehicle 1 was turned off, the SOC of the battery 7 at the time of start of the next trip will remain lower than the first set value CS1, if the battery 7 is not charged from the outside before the next trip or the operation of the vehicle 1 is started.

In the first embodiment of the operational control according to the present disclosure, it is not possible to calculate the EVSOC predicted value PSOCEV in the next trip, after the vehicle 1 is started up, that is, after the power supply of the vehicle 1 is turned on and the next trip is started, until the destination PD is input, for example. Therefore, the threshold value CSX is set to the first set value CS1, in this condition. As a result, if the SOC of the battery 7 is lower than the first set value CS1 at the time of start of a trip, first the HV operation is performed.

Next, for example, if a new destination PD is input, a new EVSOC predicted value PSOCEV for the new destination PD is calculated. Next, the threshold value CSX is set or operation of the vehicle is controlled based on the result of judgment of whether the new EVSOC predicted value PSOCEV will be maintained equal to or higher than the second set value CS2. In this case, if it is judged that the new EVSOC predicted value PSOCEV will be maintained equal to or higher than the second set value CS2, the HV operation is first performed at the start of the next trip, and is then switched to the EV operation. As a result, if short trips are repeated, the vehicle operation may be frequently switched between the EV operation and HV operation.

Therefore, in the fifth embodiment of the operational control according to the present disclosure, if, in the previous trip, the EV operation was continued until the destination PD with the SOC of the battery 7 being lower than the first set value CS1 and the vehicle 1 was then stopped, the EV operation is held unchanged until it is judged that a holding period has elapsed from when the vehicle 1 started for the next trip. Next, if it is judged that the hold period has elapsed, the EVSOC predicted value PSOCEV for the designation of the next trip, that is, the predicted value of the SOC of the battery 7 when assuming continuation of the EV operation from the current location PC to the destination PD of the next trip, is calculated. Next, based on the result of judgment of whether the EVSOC predicted value PSOCEV will be maintained equal to or higher than the second set value CS2 until the destination PD, the threshold value CSX is set and the EV operation or HV operation is performed. As a result, the vehicle operation is kept from being frequently switched.

Figure 14:
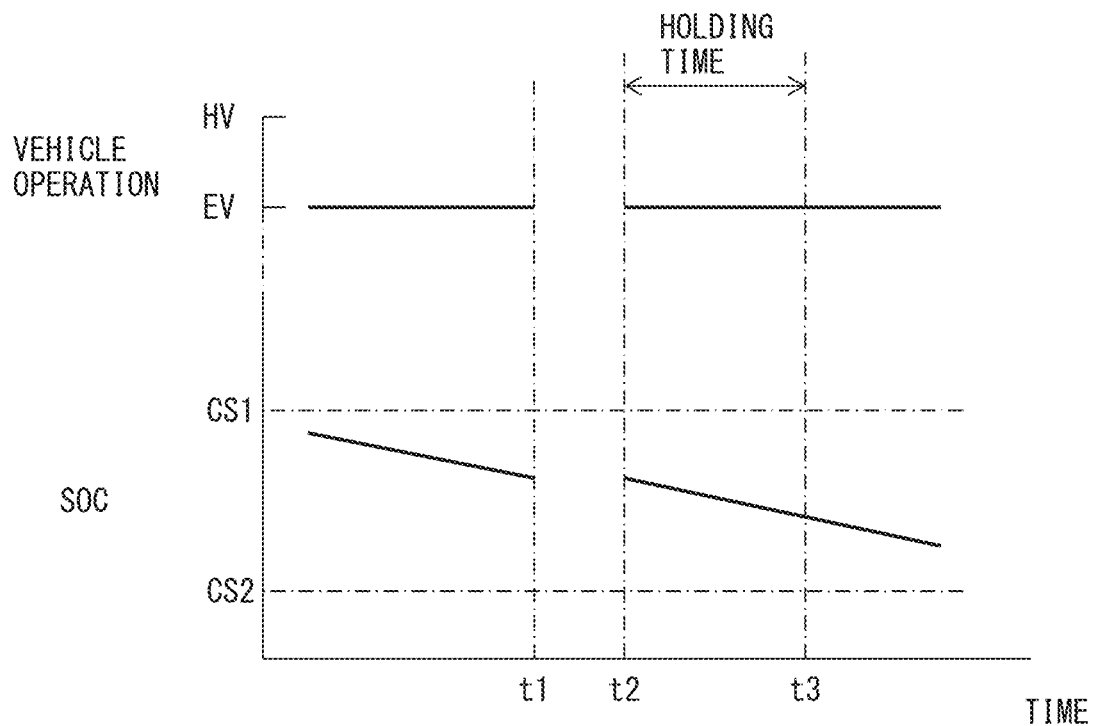
FIG. 14 is a graph showing one example of operational control and an SOC of a battery for explaining a fifth embodiment of the operational control according to the present disclosure.

That is, in the example shown in FIG. 14, at the time t1, the vehicle 1 reaches the destination PD and operation of the vehicle 1 is stopped. In this example, the EV operation is continued until the destination PD with the SOC of the battery 7 being lower than the first set value CS1. Next, at the time t2, the operation of the vehicle 1 starts, that is, the next trip is started, with the SOC of the battery 7 being lower than the first set value CS1. Next, the EV operation is performed until the time t3 where it is judged that the holding time has elapsed.

In the fifth embodiment of the operational control according to the present disclosure, for example, it is judged that the holding period has not elapsed until the driver or a passenger inputs the destination PD, while it is judged that the holding time has elapsed if the destination PD is input. Alternatively, it is judged that the holding period has not elapsed until the route up to the destination is calculated, while it is judged that the holding time has elapsed if the route is calculated. Alternatively, it is judged that the holding period has not elapsed until the electronic control unit 20 estimates the destination PD based on for example the driving history etc., while it is judged that the holding time has elapsed if the destination PD is deduced. Alternatively, it is judged that the holding time has not elapsed before the vehicle 1 communicates with an outside server etc., while it is judged that the holding time has elapsed when communication is established. Alternatively, it is judged that the holding time has not elapsed until the vehicle 1 starts to move for the next trip, that is, the vehicle 1 starts to move after power starts being conducted to the vehicle 1, while it is judged that the holding time has elapsed if the vehicle 1 starts to move. Alternatively, it is judged that the holding time has not elapsed until the predetermined holding time elapses from when the vehicle 1 is started up for the next trip, while it is judged that the holding time has elapsed if the set time elapses. Alternatively, it is judged that the holding period has not elapsed when the SOC of the battery 7 is equal to or higher than a fourth set value, which is set to be higher than the second set value CS2, while it is judged that the holding time has elapsed if the SOC of the battery 7 falls under the fourth set value.

Figure 15:
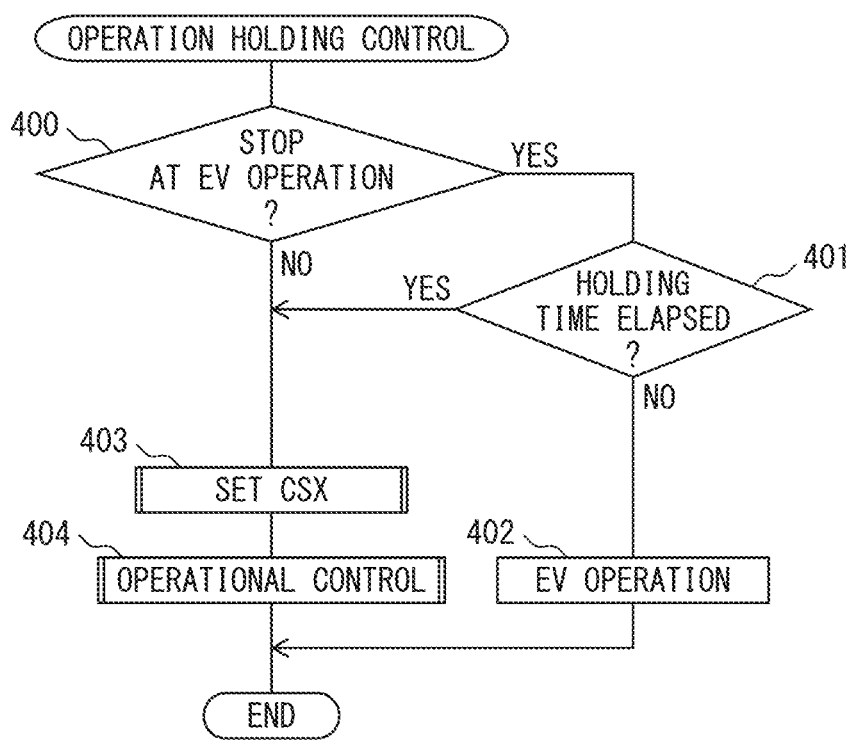
FIG. 15 is a flow chart showing a routine for operation holding control of the fifth embodiment of the operational control according to the present disclosure.

FIG. 15 shows a routine for control for operation holding control of a fifth embodiment of the operational control according to the present disclosure. The routine of FIG. 15 is repeatedly performed. Referring to FIG. 15, at step 400, it is judged if the operation of the vehicle 1 was stopped in the previous trip after continuation of the EV operation until the destination PD with the SOC of the battery 7 being lower than the first set value CS1. When it is judged that the operation of the vehicle 1 was stopped in the previous trip after continuation of the EV operation until the destination PD with the SOC of the battery 7 being lower than the first set value CS1, next, the routine proceeds to step 401 where it is judged if the holding period has elapsed. When it is judged that the holding period has not elapsed, next, the routine proceeds to step 402 where the EV operation is performed. As opposed to this, if it is judged that the holding period has elapsed, the routine proceeds to step 403 where, for example, the routine for setting the threshold valve CSX shown in FIG. 4 is performed. At the next step 404, for example, the operational control routine shown in FIG. 3 is performed. On the other hand, when it is not judged that the operation of the vehicle 1 was stopped in the previous trip after continuation of the EV operation until the destination PD with the SOC of the battery 7 being lower than the first set value CS1, the routine proceeds from step 400 to step 403.

Figure 16:
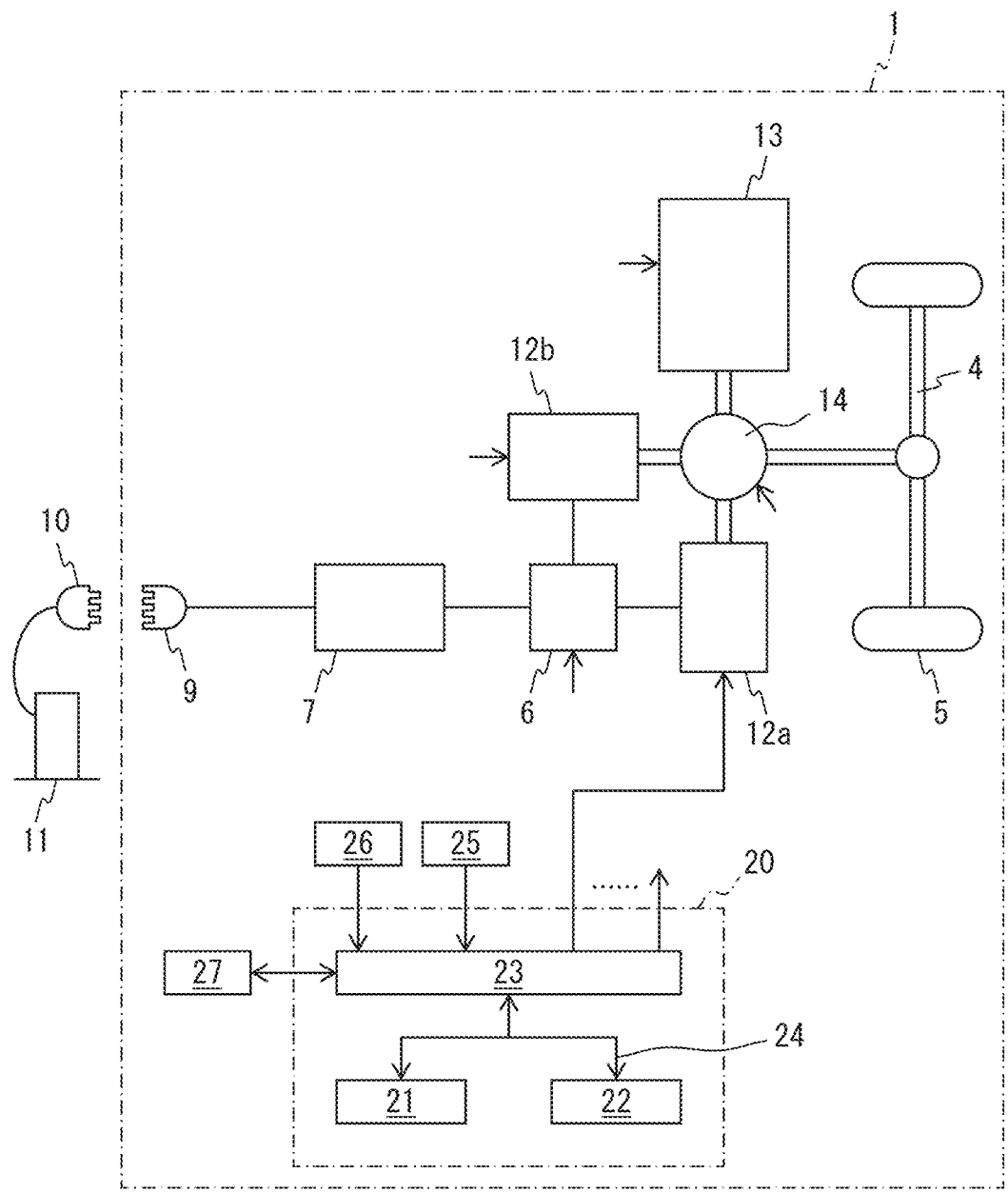
FIG. 16 is a schematic overall view of a plug-in hybrid vehicle of another embodiment according to the present disclosure.

FIG. 16 schematically shows a plug-in hybrid vehicle 1 of another embodiment according to the present disclosure. The vehicle 1 of the other embodiment according to the present disclosure differs from the vehicle 1 of the embodiment shown in FIG. 1 on the following point. That is, the vehicle 1 of the other embodiment according to the present disclosure is a so-called split type plug-in hybrid vehicle.

Specifically, the vehicle 1 of the other embodiment according to the present disclosure is provided with a pair of motor-generators 12a, 12b, an internal combustion engine 13, and a power division mechanism 14. Further, the input/output shafts of the motor-generators 12a, 12b of the other embodiment according to the present disclosure and the crankshaft of the internal combustion engine 13 are respectively connected through the power division mechanism 14 to be able to transmit power to the vehicle axle 4. In still another embodiment according to the present disclosure, the vehicle 1 is a so-called parallel type plug-in hybrid vehicle.

In the other embodiment according to the present disclosure, the motor-generators 12a, 12b are electrically connected through the power control unit 6 to the battery 7. The motor-generator 12a of the other embodiment according to the present disclosure operates as an electric motor or electric generator. When the motor-generator 12a operates as an electric motor, that is, at the time of powered operation, electric power is supplied from the battery 7 to the motor-generator 12a and the power generated at the motor-generator 12a is transmitted to the vehicle axle 4. When the motor-generator 12a operates as an electric generator, that is, at the time of regeneration, electric power is generated at the motor-generator 12a by the power from the vehicle axle 4. This electric power is supplied to and stored in the battery 7. On the other hand, the motor-generator 12b of the other embodiment according to the present disclosure operates as an electric generator. The motor-generator 12b is operated by part of the power of the internal combustion engine 13 to generate electric power. This electric power is supplied to the battery 7 or motor-generator 12a. In another embodiment (not shown), the motor-generator 12b operates as an electric motor or electric generator.

The internal combustion engine 13 of the other embodiment according to the present disclosure is a spark ignition engine or compression ignition engine. As examples of fuel of the internal combustion engine 13, gasoline, diesel fuel, alcohol, CNG, hydrogen, etc. are included. At the time of operation of the internal combustion engine 13, at least part of the output of the internal combustion engine 13 is transmitted to the vehicle axle 4 and the remainder is transmitted to the motor-generator 12b. Further, the power division mechanism 14 of the other embodiment according to the present disclosure is for example provided with a planetary gear mechanism. Furthermore, the electronic control unit 20 of the other embodiment according to the present disclosure is communicably connected with the motor-generators 12a, 12b and internal combustion engine 13.

Now then, in the other embodiment according to the present disclosure, the output of the vehicle 1 is expressed as the total of the output of the motor-generators 12a, 12b operating as electric motors and the output of the internal combustion engine 13. Here, if referring to a ratio of the outputs of the motor-generators 12a, 12b with respect to the total output of the vehicle 1 as a "motor ratio", in the EV operation of the other embodiment according to the present disclosure, the motor ratio is relatively high, while in the HV operation, the motor ratio is relatively low. That is, in one example, for the EV operation, the internal combustion engine 13 is stopped and the motor-generator 12a is operated as an electric motor. As opposed to this, at the time of an HV operation, the internal combustion engine 13 is operated and the motor-generator 12a is operated as an electric motor.

Further, in operational control of the other embodiment according to the present disclosure, when the SOC of the battery 7 is lower than the threshold value CSX, an HV operation is performed. On the other hand, when the SOC of the battery 7 is higher than the threshold value CSX, if the requested vehicle output is lower than a predetermined set output, the EV operation is performed, while if the requested vehicle output is higher than the set output, the HV operation is performed. The threshold value CSX in this case is, for example, set by the routine of FIG. 4.

In the other embodiment according to the present disclosure as well, when the HV operation is performed, the drop in the SOC of the battery 7 is restricted. As a result, in the other embodiment according to the present disclosure as well, the cost required for the vehicle to be driven by a unit distance is reduced while the SOC of the battery 7 is restricted from becoming excessively low.

Figure 17:
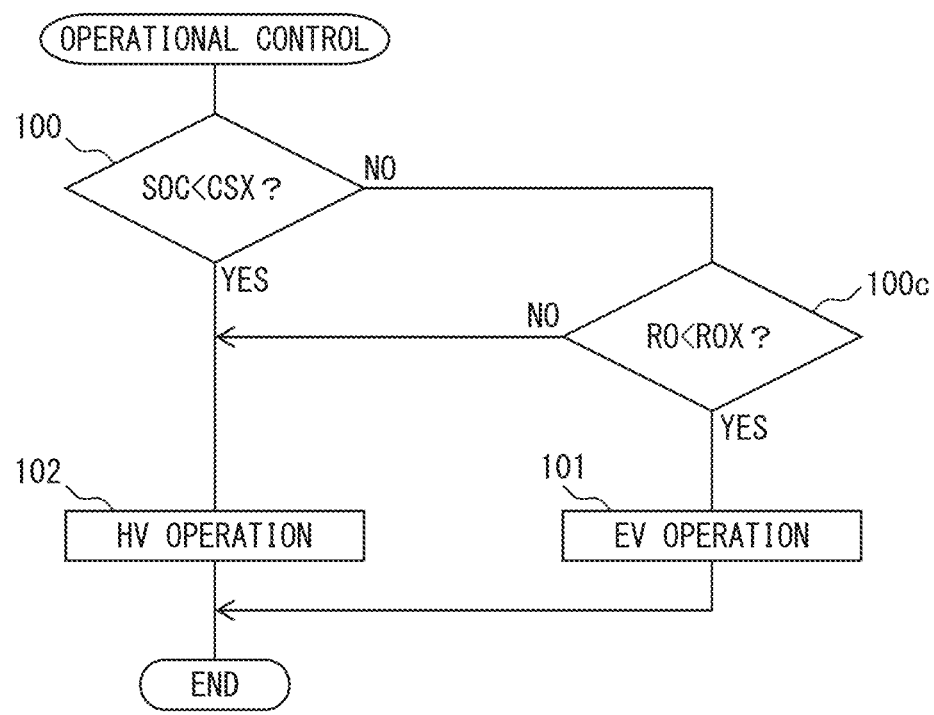
FIG. 17 is a flow chart showing an operational control routine of the other embodiment according to the present disclosure.

FIG. 17 shows an operational control routine of another embodiment according to the present disclosure. Explaining the difference between the routine of FIG. 17 and the routine of FIG. 3, in the routine of FIG. 17, when SOC≥CSX, the routine proceeds from step 100 to step 100c where it is judged if a vehicle requested output RO is lower than a set output ROX. When RO<ROX, next, the routine proceeds to step 101 where the EV operation is performed. As opposed to this, when RO≥ROX, next, the routine proceeds to step 102 where the HV operation is performed.

The various embodiments explained up to there may be suitably combined.

While the invention has been described by reference to specific embodiments chosen for purposes of illustration, it should be apparent that numerous modifications could be made thereto, by those skilled in the art, without departing from the basic concept and scope of the invention.

The present application claims the benefit of JP Application No. 2019-137211, the entire disclosure of which is incorporated by reference herein.

REFERENCE SIGNS LIST 1 plug-in hybrid vehicle
2 motor-generator
4 vehicle axle
7 battery
8 electric power generation system
8a electric generator
8b internal combustion engine
9, 10 connector
11 power supply
12a, 12b motor-generator
13 internal combustion engine
20 electronic control unit

The invention claimed is:
1. A control system for a vehicle, comprising:
an electric motor connected to a vehicle axle to be able to transmit power;
an electric power generation system;
a battery configured to supply electric power to the electric motor and to be able to be charged from the electric power generation system and from the outside of the vehicle; and
an electronic control unit configured to perform an electric vehicle (EV) operation, in which the electric motor is operated while the electric power generation system is stopped, when a state of charge (SOC) of the battery is higher than a predetermined, first set value, and to perform a hybrid vehicle (HV) operation, in which the electric motor is operated while the electric power generation system is operated, when the SOC of the battery is lower than the first set value, wherein the electronic control unit is further configured to:
continue the EV operation even if the SOC of the battery falls below the first set value when, at the time of the EV operation, it is judged that an electric vehicle state of charge (EVSOC) predicted value is maintained equal to or higher than a second set value which is lower than the first set value, the EVSOC predicted value being a predicted value of the SOC of the battery when assuming continuation of the EV operation from the current location to the destination,
continue, when it is judged that the EVSOC predicted value will fall below the second set value, the EV operation until the vehicle passes a third position between a first position and a second position and to switch from the EV operation to the HV operation if the vehicle passes the third position, the first position being a position where the EVSOC predicted value falls below the first set value and the second position being a position where the EVSOC predicted value falls below the second set value; and
set the third position so that a hybrid vehicle state of charge (HVSOC) predicted value is maintained equal to or higher than the second set value, the HVSOC predicted value being a predicted value of the SOC of the battery when assuming continuing the EV operation from the current location, then switching from the EV operation to the HV operation if the vehicle passes the third position, and then continuing the HV operation until the destination.

2. The control system for a vehicle according to claim 1, wherein the electronic control unit is further configured to continue the EV operation until the destination when it is judged that the EVSOC predicted value is maintained equal to or higher than the second set value.

3. The control system for a vehicle according to claim 2, wherein the electronic control unit is further configured to hold unchanged the EV operation until it is judged that a holding time has elapsed from when the vehicle was started for a trip originating at the destination, when, in a trip terminating at the destination, the EV operation was continued until reaching the destination with the SOC of the battery being lower than the first set value and then operation of the vehicle was stopped.

4. The control system for a vehicle according to claim 1, wherein the electronic control unit is further configured, when it is expected that the HV operation will be performed in a next trip, to switch from the EV operation to the HV operation, regardless of the EVSOC predicted value, if the SOC of the battery falls below the first set value at the time of the EV operation.

5. The control system for a vehicle according to claim 1:
wherein the electronic control unit is further configured, when it is judged that the EVSOC predicted value will fall below the second set value, to switch from the EV operation to the HV operation if the SOC of the battery falls below a third set value which is lower than the first set value and higher than the second set value; and
wherein the electronic control unit is further configured to set the third set value so that the HVSOC predicted value is maintained equal to or higher than the second set value, the HVSOC predicted value being a predicted value of the SOC of the battery when assuming continuing the EV operation from the current location, then switching from the EV operation to the HV operation if the SOC of the battery falls below the third set value, and then continuing the HV operation until the destination.

6. The control system for a vehicle according to claim 5, wherein the electronic control unit is further configured to set the third set value so that a margin of the HVSOC predicted value with respect to the second set value is minimized.

7. The control system for a vehicle according to claim 1, wherein the electronic control unit is further configured to set the third position so that a margin of the HVSOC predicted value with respect to the second set value is minimized.

8. A control system for a vehicle, comprising:
an electric motor and an internal combustion engine connected to a vehicle axle to be able to transmit power;
a battery configured to supply electric power to the electric motor and to be able to be charged from outside the vehicle; and
an electronic control unit configured to perform an electric vehicle (EV) operation, in which a motor ratio is relatively high, when a state of charge (SOC) of the battery is higher than a predetermined, first set value, and to perform a hybrid vehicle (HV) operation, in which the motor ratio is relatively low, when the SOC of the battery is lower than the first set value, the motor ratio being a ration of an output of the electric motor with respect to the total output of the vehicle,
wherein the electronic control unit is further configured to:
continue the EV operation even if the SOC of the battery falls below the first set value when, at the time of the EV operation, it is judged that an electric vehicle state of charge (EVSOC) predicted value is maintained equal to or higher than a second set value which is lower than the first set value, the EVSOC predicted value being a predicted value of the SOC of the battery when assuming continuation of the EV operation from the current location to the destination,
continue, when it is judged that the EVSOC predicted value will fall below the second set value, the EV operation until the vehicle passes a third position between a first position and a second position and to switch from the EV operation to the HV operation if the vehicle passes the third position, the first position being a position where the EVSOC predicted value falls below the first set value and the second position being a position where the EVSOC predicted value falls below the second set value; and
set the third position so that a hybrid vehicle state of charge (HVSOC) predicted value is maintained equal to or higher than the second set value, the HVSOC predicted value being a predicted value of the SOC of the battery when assuming continuing the EV operation from the current location, then switching from the EV operation to the HV operation if the vehicle passes the third position, and then continuing the HV operation until the destination.

9. The control system for a vehicle according to claim 8, wherein the electronic control unit is further configured to operate the electric motor while stopping the internal combustion engine at the time of the EV operation, and to operate the internal combustion engine and the electric motor at the time of the HV operation.

10. The control system for a vehicle according to claim 8, wherein the electronic control unit is further configured to continue the EV operation until the destination when it is judged that the EVSOC predicted value is maintained equal to or higher than the second set value.

11. The control system for a vehicle according to claim 10, wherein the electronic control unit is further configured to hold unchanged the EV operation until it is judged that a holding time has elapsed from when the vehicle was started for a trip originating at the destination, when, in a trip terminating at the destination, the EV operation was continued until reaching the destination with the SOC of the battery being lower than the first set value and then operation of the vehicle was stopped.

12. The control system for a vehicle according to claim 8, wherein the electronic control unit is further configured, when it is expected that the HV operation will be performed in a next trip, to switch from the EV operation to the HV operation, regardless of the EVSOC predicted value, if the SOC of the battery falls below the first set value at the time of the EV operation.

13. The control system for a vehicle according to claim 8:
wherein the electronic control unit is further configured, when it is judged that the EVSOC predicted value will fall below the second set value, to switch from the EV operation to the HV operation if the SOC of the battery falls below a third set value which is lower than the first set value and higher than the second set value; and
wherein the electronic control unit is further configured to set the third set value so that the HVSOC predicted value is maintained equal to or higher than the second set value, the HVSOC predicted value being a predicted value of the SOC of the battery when assuming continuing the EV operation from the current location, then switching from the EV operation to the HV operation if the SOC of the battery falls below the third set value, and then continuing the HV operation until the destination.

14. The control system for a vehicle according to claim 13, wherein the electronic control unit is further configured to set the third set value so that a margin of the HVSOC predicted value with respect to the second set value is minimized.

15. The control system for a vehicle according to claim 8, wherein the electronic control unit is further configured to set the third position so that a margin of the HVSOC predicted value with respect to the second set value is minimized.

* * * * *